United States Patent
Wolkoff

(10) Patent No.: US 11,693,375 B2
(45) Date of Patent: *Jul. 4, 2023

(54) ELECTRICAL SYSTEM CONTROL FOR ACHIEVING LONG-TERM OBJECTIVES, AND RELATED SYSTEMS, APPARATUSES, AND METHODS

(71) Applicant: Enel X North America, Inc., Boston, MA (US)

(72) Inventor: Rebecca G. Wolkoff, Shaker Heights, OH (US)

(73) Assignee: Enel X North America, Inc., Boston, MA (US)

(*) Notice: Subject to any disclaimer, the term of this patent is extended or adjusted under 35 U.S.C. 154(b) by 111 days.

This patent is subject to a terminal disclaimer.

(21) Appl. No.: 17/093,300

(22) Filed: Nov. 9, 2020

(65) Prior Publication Data

US 2021/0116873 A1 Apr. 22, 2021

Related U.S. Application Data

(63) Continuation of application No. 16/236,055, filed on Dec. 28, 2018, now Pat. No. 10,859,986.

(51) Int. Cl.
*G05B 13/04* (2006.01)
*H02J 3/32* (2006.01)
(Continued)

(52) U.S. Cl.
CPC ....... *G05B 13/042* (2013.01); *G05B 13/0265* (2013.01); *G05B 13/048* (2013.01); *G05B 15/02* (2013.01); *H02J 3/003* (2020.01); *H02J 3/004* (2020.01); *H02J 3/30* (2013.01); *H02J 3/32* (2013.01); *H02J 3/322* (2020.01); *H02J 3/381* (2013.01); *H02J 3/38* (2013.01);
(Continued)

(58) Field of Classification Search
CPC .............. G05B 13/0265; G05B 13/042; G05B 13/048; G05B 15/02; H02J 3/32; H02J 3/38; H02J 2203/20; H02J 3/003; H02J 3/004; H02J 3/30; H02J 3/322; H02J 3/381
See application file for complete search history.

(56) References Cited

U.S. PATENT DOCUMENTS 5,873,251 A 2/1999 Iino
7,797,062 B2 9/2010 Discenzo et al.
(Continued)

OTHER PUBLICATIONS

Wolkoff, Notice of Allowance dated Jul. 23, 2020 for U.S. Appl. No. 16/236,055.

*Primary Examiner* — Crystal J Barnes-Bullock
(74) *Attorney, Agent, or Firm* — Foley & Lardner LLP

(57) ABSTRACT

Systems and methods may use a low speed controller in addition to an economic optimizer to achieve long-term objectives without significantly disrupting or destabilizing an electrical system. Specific long-term objectives include maximizing a capacity factor incentive and regulating battery degradation, but the methods and systems herein can be extended to more long-term objectives. A low speed controller can adjust one or more parameters of a cost function based on the relation between the projected state of the electrical system and the one or more parameters to effectuate a change to the electrical system to attempt to comply with the long-term objective.

20 Claims, 21 Drawing Sheets

(51) Int. Cl.
*G05B 13/02* (2006.01)
*G05B 15/02* (2006.01)
*H02J 3/00* (2006.01)
*H02J 3/30* (2006.01)
*H02J 3/38* (2006.01)

(52) U.S. Cl.
CPC ....... *H02J 2203/20* (2020.01); *H02J 2300/22* (2020.01); *H02J 2300/28* (2020.01)

(56) References Cited

U.S. PATENT DOCUMENTS

| | | | |
|---|---|---|---|
| 8,019,445 | B2 | 9/2011 | Marhoefer |
| 8,600,571 | B2 | 12/2013 | Dillon et al. |
| 8,886,361 | B1 | 11/2014 | Harmon et al. |
| 9,020,800 | B2 | 4/2015 | Shelton et al. |
| 9,436,179 | B1 | 9/2016 | Turney et al. |
| 9,568,901 | B2 | 2/2017 | Hooshmand et al. |
| 9,865,024 | B2 | 1/2018 | Mokhtari et al. |
| 10,490,999 | B2 | 11/2019 | Black et al. |
| 10,658,841 | B2 | 5/2020 | Poon |
| 10,673,241 | B2 * | 6/2020 | Nakayama ............ H02J 7/0047 |
| 10,673,242 | B2 * | 6/2020 | Nakayama ............ H02J 7/0047 |
| 10,859,986 | B2 * | 12/2020 | Wolkoff ............... G05B 13/042 |
| 2005/0065674 | A1 | 3/2005 | Houpt et al. |
| 2009/0048716 | A1 | 2/2009 | Marhoefer |
| 2009/0319090 | A1 | 12/2009 | Dillon et al. |
| 2010/0174643 | A1 | 7/2010 | Schaefer et al. |
| 2010/0198421 | A1 | 8/2010 | Fahimi et al. |
| 2011/0071695 | A1 | 3/2011 | Kouroussis et al. |
| 2011/0106328 | A1 | 5/2011 | Zhou et al. |
| 2012/0296482 | A1 | 11/2012 | Steven et al. |
| 2012/0302092 | A1 | 11/2012 | Kaps et al. |
| 2012/0319642 | A1 | 12/2012 | Suyama et al. |
| 2012/0323389 | A1 | 12/2012 | Shelton et al. |
| 2013/0013121 | A1 | 1/2013 | Henze et al. |
| 2013/0030590 | A1 | 1/2013 | Prosser |
| 2013/0079939 | A1 | 3/2013 | Darden, II et al. |
| 2013/0166081 | A1 | 6/2013 | Sanders et al. |
| 2013/0166084 | A1 | 6/2013 | Sedighy et al. |
| 2013/0166234 | A1 | 6/2013 | Chou et al. |
| 2013/0226358 | A1 | 8/2013 | Rudkevich et al. |
| 2013/0226637 | A1 | 8/2013 | Bozchalui et al. |
| 2013/0261817 | A1 | 10/2013 | Detmers et al. |
| 2013/0261823 | A1 | 10/2013 | Krok et al. |
| 2013/0274935 | A1 | 10/2013 | Deshpande et al. |
| 2013/0346139 | A1 | 12/2013 | Steven et al. |
| 2014/0039965 | A1 | 2/2014 | Steven et al. |
| 2014/0058572 | A1 | 2/2014 | Stein et al. |
| 2014/0167705 | A1 | 6/2014 | Chang et al. |
| 2014/0236369 | A1 | 8/2014 | Kearns et al. |
| 2014/0266054 | A1 | 9/2014 | Faries et al. |
| 2014/0277797 | A1 | 9/2014 | Mokhtari et al. |
| 2014/0350743 | A1 | 11/2014 | Asghari et al. |
| 2014/0365022 | A1 | 12/2014 | Ghosh et al. |
| 2015/0127425 | A1 | 5/2015 | Greene et al. |
| 2015/0268307 | A1 | 9/2015 | Inguva et al. |
| 2015/0355655 | A1 | 12/2015 | Wang et al. |
| 2016/0011274 | A1 | 1/2016 | Morita et al. |
| 2016/0041575 | A1 | 2/2016 | Tadano |
| 2016/0047862 | A1 | 2/2016 | Shimizu et al. |
| 2016/0377686 | A1 | 12/2016 | Uchida et al. |
| 2017/0099056 | A1 | 4/2017 | Vickery et al. |
| 2017/0285111 | A1 | 10/2017 | Fife |
| 2017/0285587 | A1 | 10/2017 | Fife |
| 2017/0285678 | A1 | 10/2017 | Fife |
| 2017/0286882 | A1 | 10/2017 | Fife |
| 2017/0317528 | A1 | 11/2017 | Fife |
| 2019/0042992 | A1 | 2/2019 | Fife |
| 2020/0212677 | A1 | 7/2020 | Wolkoff |
| 2021/0011439 | A1 * | 1/2021 | Goverde ................ G05B 15/02 |
| 2021/0358058 | A1 * | 11/2021 | da Mata Cecilio .... G06Q 50/06 |

* cited by examiner

ELECTRICAL SYSTEM CONTROL FOR ACHIEVING LONG-TERM OBJECTIVES, AND RELATED SYSTEMS, APPARATUSES, AND METHODS

RELATED APPLICATIONS

This application is a continuation of U.S. patent application Ser. No. 16/236,055, filed Dec. 28, 2018 and titled ELECTRICAL SYSTEM CONTROL FOR ACHIEVING LONG-TERM OBJECTIVES, AND RELATED SYSTEMS, APPARATUSES, AND METHODS, the entirety of which is incorporated herein by reference.

TECHNICAL FIELD

The present disclosure is directed to systems and methods for control of an electrical system, and more particularly to controllers and methods of controllers for controlling an electrical system.

BACKGROUND

Electricity supply and delivery costs continue to rise, especially in remote or congested areas. Moreover, load centers (e.g., population centers where electricity is consumed) increasingly demand more electricity. In the U.S., energy infrastructure is such that power is mostly produced by resources inland, and consumption of power is increasing at load centers along the coasts. Thus, transmission and distribution (T&D) systems are needed to move the power from where it is generated to where it is consumed at the load centers. As the load centers demand more electricity, additional T&D systems are needed, particularly to satisfy peak demand. However, a major reason construction of additional T&D systems is unwise and/or undesirable is because full utilization of this infrastructure is really only necessary during relatively few peak demand periods, and would otherwise be unutilized or underutilized. Justifying the significant costs of constructing additional T&D resources may make little sense when actual utilization may be relatively infrequent.

Distributed energy storage is increasingly seen as a viable means for minimizing rising costs by storing electricity at the load centers for use during the peak demand times. An energy storage system (ESS) can enable a consumer of energy to reduce or otherwise control a net consumption from an energy supplier. For example, if electricity supply and/or delivery costs are high at a particular time of day, an ESS, which may include one or more batteries or other storage devices, can generate/discharge electrical energy at that time when costs are high in order to reduce the net consumption from the supplier. Likewise, when electricity rates are low, the ESS may charge so as to have reserve energy to be utilized in a later scenario as above, when supply and/or delivery costs are high.

An automatic controller may be beneficial to reduce costs of operation of an electrical system during peak demand times.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION

Figure 1:
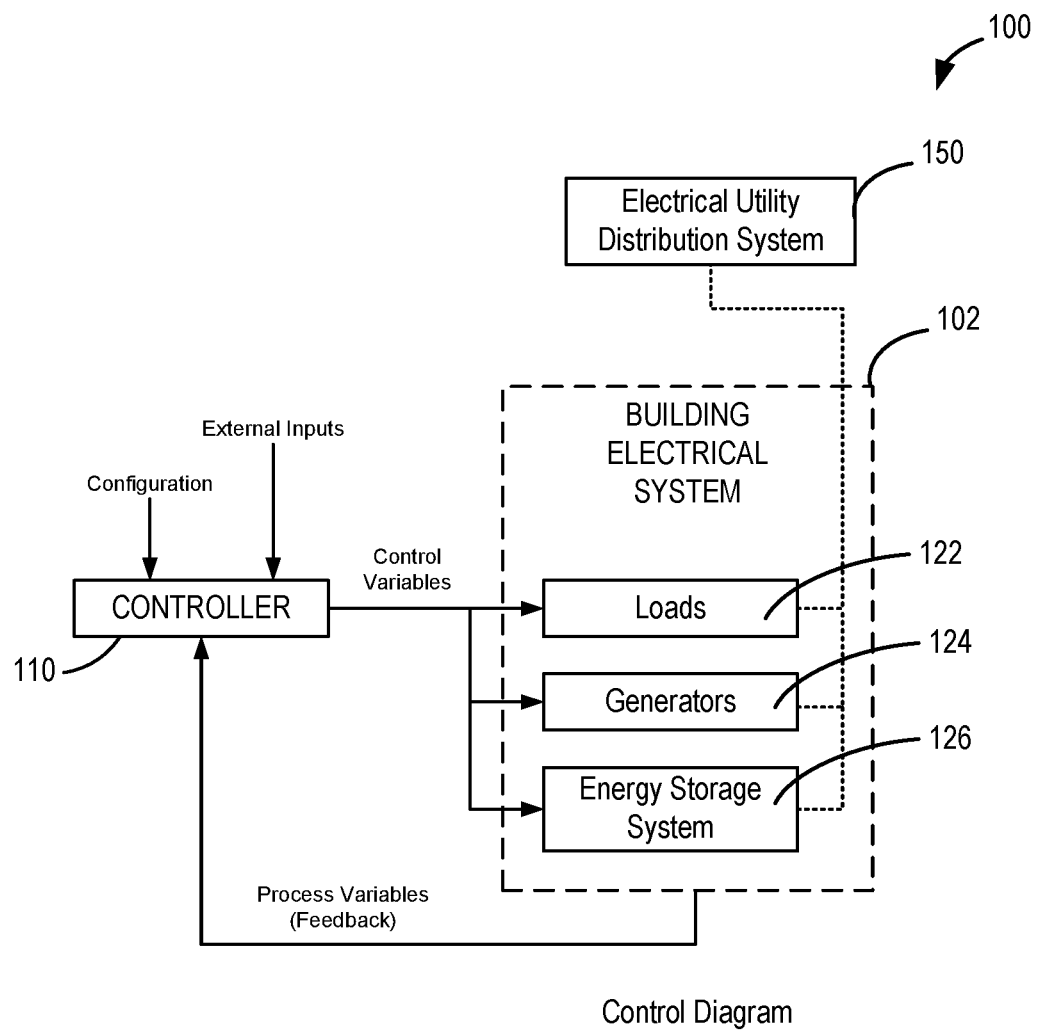
FIG. 1 is a block diagram illustrating a system architecture of a controllable electrical system, according to one embodiment of the present disclosure.

As electricity supply and delivery costs increase, especially in remote or congested areas, distributed energy storage is increasingly seen as a viable means for reducing those costs. The reasons are numerous, but primarily an energy storage system (ESS) gives a local generator or consumer the ability to control net consumption and delivery of electrical energy at a point of interconnection, such as a building's service entrance in example implementations where an ESS is utilized in an apartment building or office building. For example, if electricity supply and/or delivery costs (e.g., charges) are high at a particular time of day, an ESS can generate/discharge electrical energy from a storage system at that time to reduce the net consumption of a consumer (e.g., a building), and thus reduce costs to the consumer. Likewise, when electricity rates are low, the ESS may charge its storage system, which may include one or more batteries or other storage devices; the lower-cost energy stored in the ESS can then be used to reduce net consumption and thus reduce costs to the consumer at times when the supply and/or delivery costs are high. There are many ways an ESS can provide value.

One possible way in which ESSs can provide value is by reducing demand charges. Demand charges are electric utility charges that are based on the rate of electrical energy consumption (also called "demand") during particular time windows (called "demand windows" herein). A precise definition of demand and the formula for demand charges may be defined in a utility's tariff document. For example, a tariff may specify that demand be calculated at given demand intervals (e.g., 15-minute intervals, 30-minute intervals, 40-minute intervals, 60-minute intervals, 120-minute intervals, etc.). The tariff may also define demand as being the average rate of electrical energy consumption over a previous period of time (e.g., the previous 15 minutes, 30 minutes, 40 minutes, etc.). The previous period of time may or may not coincide with the demand interval. Demand may be expressed in units of power such as kilowatts (kW) or megawatts (MW). The tariff may describe one or more demand rates, each with an associated demand window (e.g., a period of time during which a demand rate applies). The demand windows may be contiguous or noncontiguous and may span days, months, or any other total time interval per the tariff. Also, one or more demand windows may overlap, which means that, at a given time, more than one demand rate may be applicable. Demand charges for each demand window may be calculated as a demand rate multiplied by the maximum demand during the associated demand window. Demand rates in the United States may be expressed in dollars per peak demand ($/kW). As can be appreciated, demand tariffs may change from time to time, or otherwise vary, for example annually, seasonally, monthly, or daily. An automatic controller may be beneficial and may be desirable to enable intelligent actions to be taken as frequently as may be needed to utilize an ESS to reduce demand charges.

Another possible way in which ESSs can provide value is through improving utilization of local generation by: (a) maximizing self-consumption of renewable energy, or (b) reducing fluctuations of a renewable generator such as during cloud passage on solar photovoltaic arrays. An automatic controller may be beneficial and may be desirable to enable intelligent actions to be taken to effectively and more efficiently utilize locally generated power with an ESS.

Another possible way in which ESSs can provide value is through leveraging local contracted or incentive maneuvers. For example, New York presently has available a Demand Management Program (DMP) and a Demand Response Program (DRP). These programs, and similar programs, offer benefits (e.g., a statement credit) or other incentives for consumers to cooperate with the local utility(ies). An automatic controller may be beneficial and may be desirable to enable intelligent actions to be taken to utilize an ESS to effectively leverage these contracted or incentive maneuvers.

Still another possible way in which ESSs can provide value is through providing reserve battery capacity for backup power in case of loss of supply. An automatic controller may be beneficial and may be desirable to enable intelligent actions to be taken to build and maintain such reserve battery backup power with an ESS.

Another possible way in which ESSs can provide value is through improving utilization of a battery within the ESSs. For example, a company servicing the ESS may replace the battery after a target number of years (e.g., warranty period). The ESS can provide value by causing the battery to be used enough that a target battery capacity is reached at the target number of years.

As can be appreciated, an automatic controller that can automatically operate an electrical system to reduce demand charges using an ESS may be desirable and beneficial.

Short-Term Objectives and Long-Term Objectives

Embodiments of the present disclosure may be able to consider and achieve short-term objectives and long-term objectives. One or more controllers, according to the present disclosure, may enable components of an electrical system, for example an ESS, to achieve short-term objectives and long-term objectives by utilizing optimization to make decisions over a specific upcoming time domain. An upcoming time domain (sometimes referred to as a command window) may be a time window over which the controller optimizes operation of the electrical system and during which commands from the controller are provided. Stated differently, an optimizer optimizes over an upcoming time domain and provides commands to be applied during the upcoming time domain to optimizing operation of the electrical system for a duration of the upcoming time domain. The upcoming time domain may be divided up into smaller increments (time segments) for optimization. Optimization outputs one or more control parameters that can be used for the time length of an upcoming time domain or time segment of the upcoming time domain to achieve a short-term goal.

Long-term objectives may extend beyond an upcoming time domain. This disclosure and embodiments according to the present disclosure specifically attempt to address how long-term objectives may be achieved without significantly disrupting or destabilizing the system. Examples of specific long-term objectives that may be addressed are maximizing a capacity factor incentive and regulating battery degradation, but the methodologies communicated can be extended to any long-term objective. For example, in some embodiments, the long term objectives may include generation of power from a generator, solar panel, or wind turbine over a length of time. Although the examples provided are specifically applicable to economic optimization of an ESS, the methods can be applied to any optimization system with overarching long-term objectives.

The long-term objective may be a rule set or value pair that may or may not have numerical values associated therewith. For a first example, the long-term objective may be a value pair that specifies a threshold value for battery capacity and a desired battery life length of time. Or, as a second example, the long-term objective may specify delivery of a certain energy over a specified time period. The long-term objective may also specify multiple time periods. Each long-term objective may have some number of parameterized values associated with it. In the first example, the threshold value for battery capacity and/or the desired battery life length of time may be a parameterized value. In the second example above, the amount of energy may be a parameterized value. Long-term objectives may also have multiple parameterized values.

In general, the long-term objective may provide parameters, constraints, rules, or the like, for guiding the use of components of an electrical system (e.g., use of battery). The long-term objective is a set of instructions that specifies desired operating conditions for the components over a length of time, and the parameterized values specify the length of time and the operating conditions. As an example, the long-term objective for a battery may be a threshold battery capacity to be maintained for a specific period of time. The parameterized value may be the threshold battery capacity and/or the specific period of time. In the battery life example, the long-term objectives may define a set of decision variables that indicates number of charge cycles for a battery during a period of time. Other parameters representing long-term objectives are possible.

Controlling Electrical Systems

An electrical system, according to some embodiments, may include one or more electrical loads, generators, and ESSs. An electrical system may include all three of these components (loads, generators, ESSs), or may have varying numbers and combinations of these components. For example, an electrical system may have loads and an ESS, but no local generators (e.g., photovoltaic, wind). The electrical system may or may not be connected to an electrical utility distribution system (or "grid"). If not connected to an electrical utility distribution system, it may be termed "off-grid."

An ESS of an electrical system may include one or more storage devices and any number of power conversion devices. The power conversion devices are able to transfer energy between an energy storage device and the main electrical power connections that in turn connect to the electrical system loads and, in some embodiments, to the grid. The energy storage devices may be different in different implementations of the ESS. A battery is a familiar example of a chemical energy storage device. For example, in one embodiment of the present disclosure, one or more electric vehicle batteries are connected to an electrical system and can be used to store energy for later use by the electrical system. A flywheel is an example of a mechanical energy storage device.

FIG. 1 is a control diagram of an electrical system 100, according to one embodiment of the present disclosure. Stated otherwise, FIG. 1 is a representative diagram of a system architecture of an electrical system 100 including a controller 110, according to one embodiment. The electrical system 100 comprises a building electrical system 102 (sometimes called the "plant") that is controlled by the controller 110. The building electrical system 102 includes one or more loads 122, one or more generators 124, and an energy storage system (ESS) 126. The building electrical system 102 is coupled to an electrical utility distribution system 150, and therefore may be considered on-grid. Similar electrical systems exist for other applications such as a photovoltaic generator plant and an off-grid building.

In the control diagram of FIG. 1, the controller 110 is shown on the left-hand side and the building electrical system 102, sometimes called the "plant," is on the right-hand side. The controller 110 may include electronic hardware and software in one embodiment. In one example arrangement, the controller 110 includes one or more processors and suitable storage media, which store programming in the form of executable instructions that are executed by the processors to implement the control processes. In some embodiments, the building electrical system 102 is the combination of all local loads 122, local generators 124, and the ESS 126.

Loads are consumers of electrical energy within an electrical system. Examples of loads are air conditioning systems, motors, electric heaters, etc. The sum of the loads' electricity consumption rates can be measured in units of power (e.g., kW) and simply called "load" (e.g., a building load).

Generators may be devices, apparatuses, or other means for generating electrical energy within an electrical system. Examples are solar photovoltaic systems, wind generators, combined heat and power (CHP) systems, and diesel generators or "gen-sets." The sum of electric energy generation rates of the generators 124 can be measured in units of power (e.g., kW) and simply referred to as "generation."

As can be appreciated, loads may also generate at certain times. An example may be an elevator system that is capable of regenerative operation when the carriage travels down.

Unadjusted net power may refer herein to load minus generation in the absence of active control by a controller described herein. For example, if at a given moment a building has loads consuming 100 kW, and a solar photovoltaic system generating at 25 kW, the unadjusted net power is 75 kW. Similarly, if at a given moment a building has loads consuming 70 kW, and a solar photovoltaic system generating at 100 kW, the unadjusted net power is −30 kW. As a result, the unadjusted net power is positive when the load energy consumption exceeds generation, and negative when the generation exceeds the load energy consumption.

ESS power refers herein to a sum of a rate of electric energy consumption of an ESS. If ESS power is positive, an ESS is charging (consuming energy). If ESS power is negative, an ESS is generating (delivering energy).

Adjusted net power refers herein to unadjusted net power plus the power contribution of any controllable elements such as an ESS. Adjusted net power is therefore the net rate of consumption of electrical energy of the electrical system considering all loads, generators, and ESSs in the system, as controlled by a controller described herein.

Unadjusted demand is demand defined by the locally applicable tariff, but only based on the unadjusted net power. In other words, unadjusted demand does not consider the contribution of any ESS.

Adjusted demand or simply "demand" is demand as defined by the locally applicable tariff, based on the adjusted net power, which includes the contribution from any and all controllable elements such as ESSs. Adjusted demand is the demand that can be monitored by the utility and used in the demand charge calculation.

Referring again to FIG. 1, the building electrical system 102 may provide information to the controller 110, such as in a form of providing process variables. The process variables may provide information, or feedback, as to a status (e.g., a current state, condition, or operating condition) of the building electrical system 102 and/or one or more components (e.g., loads 122, generators 124, ESSs 126) therein. For example, the process variables may provide one or more measurements of a state of the electrical system. The controller 110 receives the process variables for determining values for control variables to be communicated to the building electrical system 102 to effectuate a change to the building electrical system 102 toward meeting a controller objective for the building electrical system 102.

For example, the controller 110 may provide a control variable to adjust the load 122, to increase or decrease generation by the generator 124, and to utilize (e.g., charge or discharge) the ESS 126. The controller 110 may also receive a configuration (e.g., a set of configuration elements), which may specify one or more constraints of the electrical system 102. The controller 110 may also receive external inputs (e.g., weather reports, changing tariffs, fuel costs, event data), which may inform the determination of the values of the control variables. A set of external inputs may be received by the controller 110. The set of external inputs may provide indication of one or more conditions that are external to the controller 110 and the electrical system 102.

As noted, the controller 110 may attempt to meet certain objectives by changing a value associated with one or more control variables, if necessary. The objectives may be pre-defined, and may also be dependent on time, on any external inputs, on any process variables that are obtained from the building electrical system 102, and/or on the control variables themselves. Some examples of controller objectives for different applications are:

Minimize demand (kW) over a prescribed time interval;
Minimize demand charges ($) over a prescribed time interval;
Minimize total electricity charges ($) from the grid;
Reduce demand (kW) from the grid by a prescribed amount during a prescribed time window;
Maximize the life of the energy storage device; and
Maximize utilization of the energy storage device battery over a target period of time.

Objectives can also be compound—that is, a controller objective can comprise multiple individual objectives. One example of a compound objective is to minimize demand charges while maximizing the life of the energy storage device. Other compound objectives including different combinations of the individual objectives are possible.

Some objectives are short-term and some objectives are long-term. Short-term objectives are objectives that may be accomplished during an upcoming time domain. In other words, a short-term objective may be accomplished during a time window during which a set of commands provided from the controller 110 are configured to optimize or otherwise influence operation of the electrical system. A short-term objective may include minimizing demand (kW) over a prescribed time interval, minimizing demand charges ($) over a prescribed time interval, minimizing total electricity charges ($) from the grid, or reducing demand (kW). A long-term objective is a goal that extends beyond the upcoming time domain of an optimization problem. Long-term objectives could include regulating battery life, meeting an annual energy-use requirement, or maximizing a capacity factor incentive. A single controller attempting to solve for both short-term and long-term objectives over the same upcoming time domain (or command window) may destabilize or overcompensate for the long-term objective and fail to optimize the electrical system for the short-term objectives.

The inputs that the controller 110 may use to determine (or otherwise inform a determination of) the control variables can include configuration, external inputs, and process variables.

Process variables are typically measurements of the electrical system state and are used by the controller 110 to, among other things, determine how well its objectives are being met. These process variables may be read and used by the controller 110 to generate new control variable values. The rate at which process variables are read and used by the controller 110 depends upon the application but typically ranges from once per millisecond to once per hour. For battery ESS applications, the rate is often between 10 times per second and once per 15 minutes. Examples of process variables may include:

Unadjusted net power
Unadjusted demand
Adjusted net power
Demand
Load (e.g., load energy consumption for one or more loads)
Generation for one or more loads
Actual ESS charge or generation rate for one or more ESSs
Frequency
Energy storage device state of charge (SoC) (%) for one or more ESSs
Energy storage device temperature (deg. C.) for one or more ESSs
Electrical meter outputs such as kilowatt-hours (kWh) or demand
Battery degradation
Battery capacity loss
Battery age A configuration received by the controller 110 (or input to the controller 110) may include or be received as one or more configuration elements (e.g., a set of configuration elements). The configuration elements may specify one or more constraints associated with operation of the electrical system 102. The configuration elements may define one or more cost elements associated with operation of the electrical system 102. Each configuration element may set a status, state, constant or other aspect of the operation of the electrical system 102. The configuration elements may be values that are typically constant during the operation of the controller 110 and the electrical system 102 at a particular location. The configuration elements may specify one or more constraints of the electrical system and/or specify one or more cost elements associated with operation of the electrical system.

Examples of configuration elements may include:
ESS type (for example, if a battery: states of charge, chemistry, manufacturer, and cell model)
ESS configuration (for example, if a battery: number of cells in series and parallel) and constraints (such as maximum charge and discharge powers)
ESS efficiency properties
ESS degradation properties (as a function of SoC, discharge or charge rate, and time)
Electricity supply tariff (including time of use supply rates and associated time windows)
Electricity demand tariff (including demand rates and associated time windows)
Electrical system constraints such as minimum power import
ESS constraints such as SoC limits or power limits (including maximum and minimum state of charge)
Historic data such as unadjusted net power or unadjusted demand, weather data, and occupancy
Operational constraints such as a requirement for an ESS to have a specified minimum amount of energy at a specified time of day
Goal ESS battery life (e.g., the desired lifespan of the battery)
Desired battery capacity at end of battery life External inputs are variables that may be used by the controller 110 and that may change during operation of the controller 110. Examples are weather forecasts (e.g., irradiance for solar generation and wind speeds for wind generation) and event data (e.g., occupancy predictions). In some embodiments, tariffs (e.g., demand rates defined therein) may change during the operation of the controller 110, and may therefore be treated as an external input.

The outputs of the controller 110 are the control variables that can affect the electrical system behavior. Examples of control variables are:

ESS power command (kW or %). For example, an ESS power command of 50 kW would command the ESS to charge at a rate of 50 kW, and an ESS power command of −20 kW would command the ESS to discharge at a rate of 20 kW.

Building or subsystem net power increase or reduction (kW or %).

Renewable energy increase or curtailment (kW or %). For example, a photovoltaic (PV) system curtailment command of −100 kW would command a PV system to limit generation to no less than −100 kW. Again, the negative sign is indicative of the fact that the value is generative (non-consumptive).

In some embodiments, control variables that represent power levels may be signed, e.g., positive for consumptive or negative for generative.

In one illustrative example, consider that an objective of the controller 110 may be to reduce demand charges while preserving battery life. In this example, only the ESS may be controlled. To accomplish this objective, the controller 110 should have knowledge of a configuration of the electrical system 102, such as the demand rates and associated time windows, the battery capacity, the battery type and arrangement, etc. Other external inputs may also be used to help the controller 110 meet its objectives, such as a forecast of upcoming load and/or forecast of upcoming weather (e.g., temperature, expected solar irradiance, wind). Process variables from the electrical system 102 that may be used may provide information concerning a net electrical system power or energy consumption, demand, a battery SoC, an unadjusted building load, and an actual battery charge or discharge power.

In this one illustrative example, the control variable may be a commanded battery ESS's charge or discharge power. In order to more effectively meet the objective, the controller 110 may continuously track the peak net building demand (kW) over each applicable time window, and use the battery to charge or generate at appropriate times to limit the demand charges. In one specific example scenario, the ESS 126 may be utilized to attempt to achieve substantially flat (or constant) demand from the electrical utility distribution system 150 (e.g., the grid) during an applicable time window when a demand charge applies.

Figure 2:
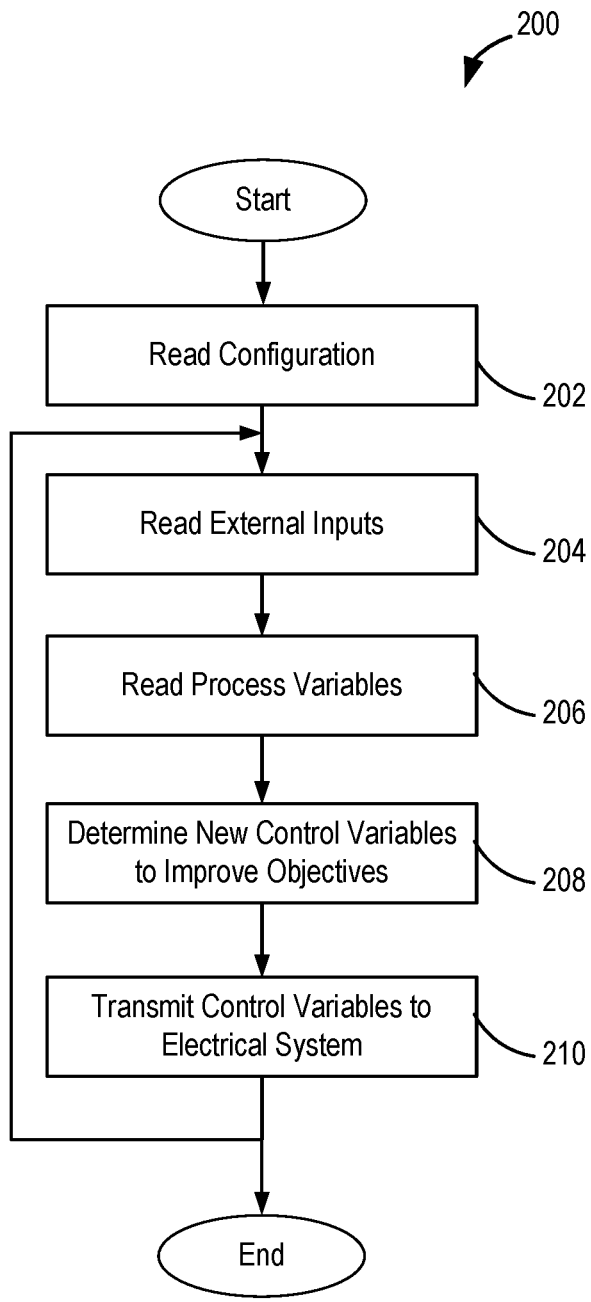
FIG. 2 is a flow diagram of a method or process of controlling an electrical system, according to one embodiment of the present disclosure.

FIG. 2 is a flow diagram of a method 200 or process of controlling an electrical system, according to one embodiment of the present disclosure. The method 200 may be implemented by a controller of an electrical system, such as the controller 110 of FIG. 1 controlling the building electrical system 102 of FIG. 1. The controller may read 202 or otherwise receive a configuration (e.g., a set of configuration elements) of the electrical system.

The controller may also read 204 or otherwise receive external inputs, such as weather reports (e.g., temperature, solar irradiance, wind speed), changing tariffs, event data (e.g., occupancy prediction, sizeable gathering of people at a location or venue), and the like.

The controller may also read 206 or otherwise receive process variables, which may be measurements of a state of the electrical system and indicate, among other things, how well objectives of the controller are being met. The process variables provide feedback to the controller as part of a feedback loop.

Using the configuration, the external inputs, and/or the process variables, the controller determines 208 new control variables to improve achievement of objectives of the controller. Stated differently, the controller determines 208 new values for each control variable to effectuate a change to the electrical system toward meeting one or more controller objectives for the electrical system. Once determined, the control variables (or values thereof) are transmitted 210 to the electrical system or components of the electrical system. The transmission 210 of the control variables to the electrical system allows the electrical system to process the control variables to determine how to adjust and change state, which thereby can effectuate the objective(s) of the controller for the electrical system.

Optimization

In some embodiments, the controller uses an algorithm (e.g., an optimization algorithm) to determine the control variables, for example, to improve performance of the electrical system. Optimization can be a process of finding a variable or variables at which a function f(x) is minimized or maximized. An optimization may be made with reference to such global extrema (e.g., global maximums and/or minimums), or even local extrema (e.g., local maximums and/or minimums). Given that an algorithm that finds a minimum of a function can generally also find a maximum of the same function by negating it, this disclosure will sometimes use the terms "minimization," "maximization," and "optimization" interchangeably.

An objective of optimization may be economic optimization, or determining economically optimal control variables to effectuate one or more changes to the electrical system to achieve economic efficiency (e.g., to operate the electrical system at as low a cost as may be possible, given the circumstances). As can be appreciated, other objectives may be possible as well (e.g., regarding equipment life, system reliability, system availability, fuel consumption, etc.).

The present disclosure includes embodiments of controllers that optimize a single parameterized cost function (or objective function) for effectively utilizing controllable components of an electrical system in an economically optimized manner. Various forms of optimization may be utilized to economically optimize an electrical system.

Continuous Optimization

A controller according to some embodiments of the present disclosure may use continuous optimization to determine the control variables. More specifically, the controller may utilize a continuous optimization algorithm, for example, to find economically optimal control variables to effectuate one or more changes to the electrical system to achieve economic efficiency (e.g., to operate the electrical system at as low a cost as may be possible, given the circumstances). The controller, in one embodiment, may operate on a single objective: optimize overall system economics. Since this approach has only one objective, there can be no conflict between objectives. And by specifying system economics appropriately in the cost function (or objective function), all objectives and value streams can be considered simultaneously based on their relative impact on a single value metric. The cost function may be continuous in its independent variables x, and optimization can be executed with a continuous optimization algorithm that is effective for continuous functions. Continuous optimization differs from discrete optimization, which involves finding the optimum value from a finite set of possible values or from a finite set of functions.

As can be appreciated, in another embodiment, the cost function may be discontinuous in x (e.g., discrete or finite) or piecewise continuous in x, and optimization can be executed with an optimization algorithm that is effective for discontinuous or piecewise continuous functions.

Constrained Optimization

In some embodiments, the controller utilizes a constrained optimization to determine the control variables. In certain embodiments, the controller may utilize a constrained continuous optimization to find a variable or variables $x_{opt}$ at which a continuous function f(x) is minimized or maximized subject to constraints on the allowable x.

Figure 3:
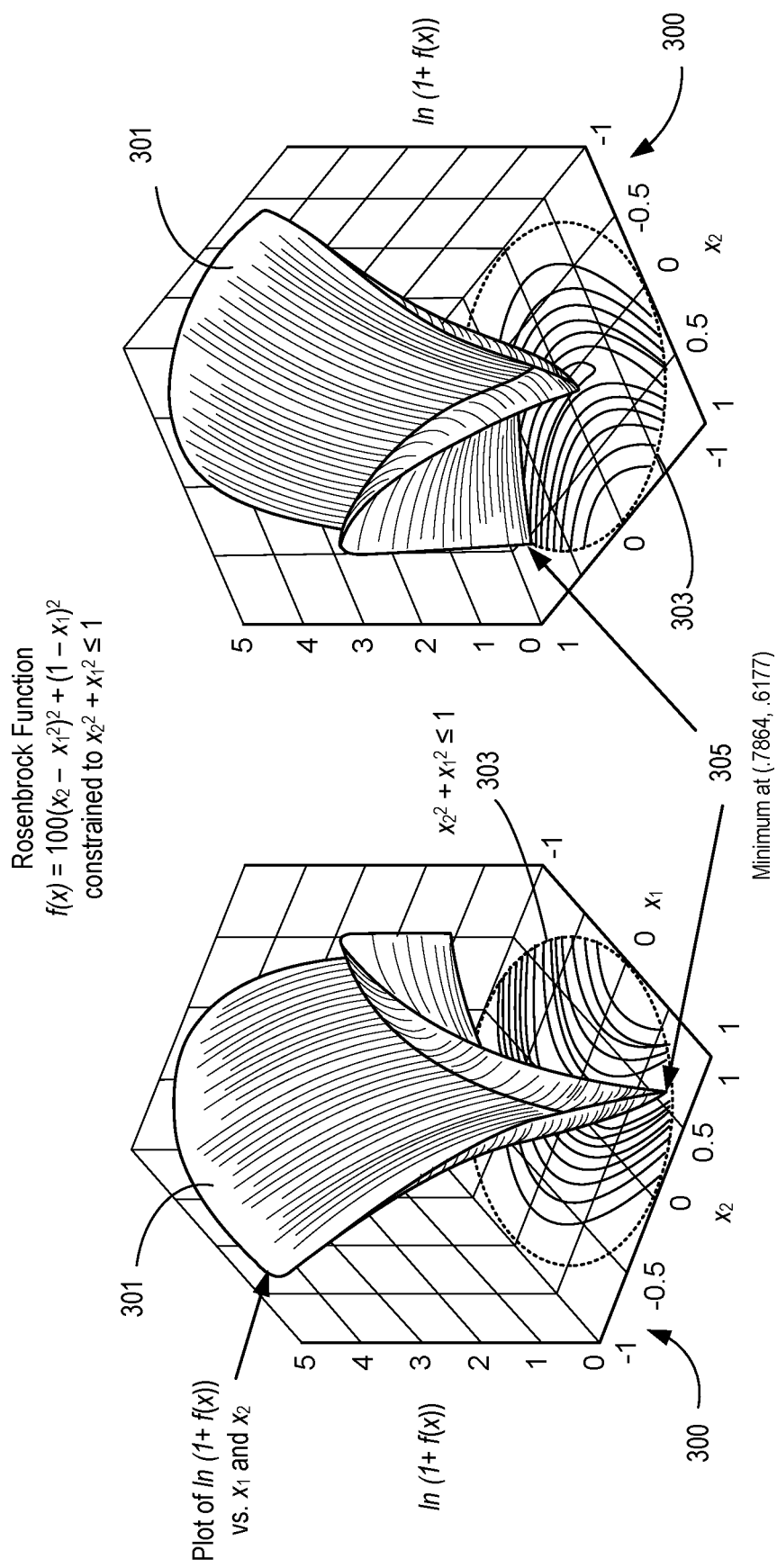
FIG. 3 is a graph illustrating an example of nonlinear continuous optimization to determine a minimum or maximum of an equation given specific constraints.
Figure 4:
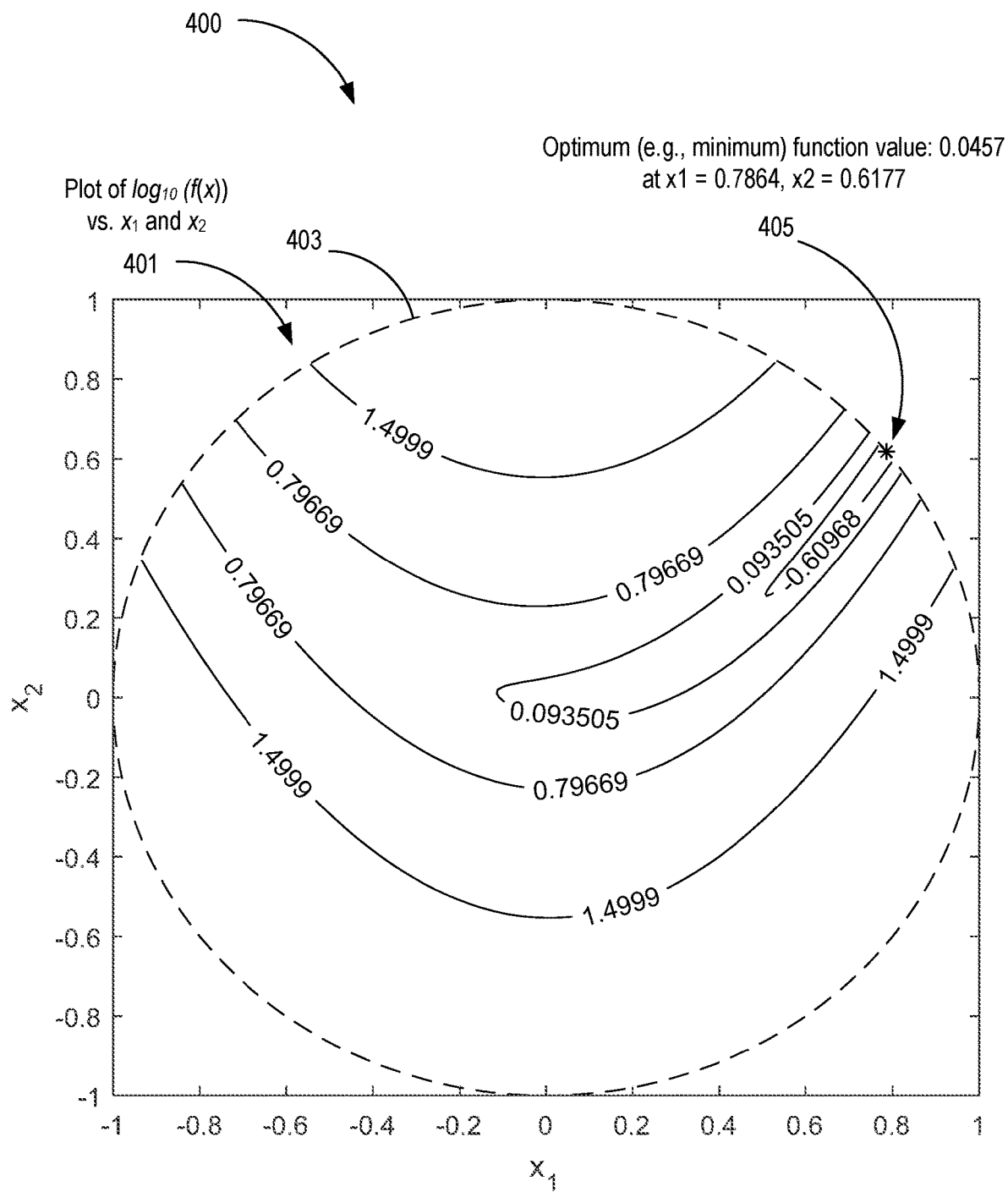
FIG. 4 is a contour plot illustrating the example of nonlinear continuous optimization of FIG. 3 to determine a minimum or maximum of an equation given specific constraints.

FIGS. 3 and 4 show a graph 300 and a contour plot 400 illustrating an example of a constrained continuous optimization to determine a minimum or maximum of an equation given specific constraints. Possible constraints may be an equation or inequality. FIGS. 3 and 4 consider an equation:

$$f(x)=100(x_2-x_1^2)^2+(1-x_1)^2.$$

The set x includes the independent variables $x_1$, $x_2$. Constraints are defined by the equation:

$$x_2^2+x_1^2 \leq 1.$$

FIG. 3 illustrates a curve 301 of ln (1+f(x)) vs. $x_1$ and $x_2$ and illustrates the constraint within an outlined unit disk 303. A minimum 305 is at (0.7864, 0.6177).

FIG. 4 illustrates a contour plot 401 of $\log_{10}(f(x))$, which also shows the constraints within the outlined unit disk 403 and a minimum 405 is at (0.7864, 0.6177).

Constrained continuous optimization algorithms are useful in many areas of science and engineering to find a "best" or "optimal" set of values that affect a governing of a process. They are particularly useful in cases where a single metric is to be optimized, but the relationship between that metric and the independent (x) variables is so complex that a "best" set of x values cannot easily be found symbolically in closed form. For example, consider a malignant tumor whose growth rate over time is dependent upon pH and on the concentration of a particular drug during various phases of growth. The equation describing growth rate as a function of the pH and drug concentration is known and can be written down but may be complex and nonlinear. It might be very difficult or impossible to solve the equation in closed form for the best pH and drug concentration at various stages of growth. It may also depend on external factors such as temperature. To solve this problem, pH and drug concentration at each stage of growth can be combined into an x vector with two elements. Since the drug concentration and pH may have practical limits, constraints on x can be defined. Then the function can be minimized using constrained continuous optimization. The resulting x where the growth rate is minimized contains the "best" pH and drug concentration to minimize growth rate. Note this approach can find the optimum pH and drug concentration (to machine precision) from a continuum of infinite possibilities of pH and drug concentration, not just from a predefined finite set of possibilities.

Generalized Optimization

A controller according to some embodiments of the present disclosure may use generalized optimization to determine the control variables. More specifically, the controller may utilize a generalized optimization algorithm, for example, to find economically optimal control variables to effectuate one or more changes to the electrical system to achieve economic efficiency (e.g., to operate the electrical system at as low a cost as may be possible, given the circumstances).

An algorithm that can perform optimization for an arbitrary or general real function f(x) of any form may be called a generalized optimization algorithm. An algorithm that can perform optimization for a general continuous real function f(x) of a wide range of possible forms may be called a generalized continuous optimization algorithm. Some generalized optimization algorithms may be able to find optimums for functions that may not be continuous everywhere, or may not be differentiable everywhere. Some generalized optimization algorithms are available as pre-written software in many languages including Java®, C++, and MATLAB®. They often use established and well-documented iterative approaches to find a function's minimum.

As can be appreciated, a generalized optimization algorithm may also account for constraints, and therefore be a generalized constrained optimization algorithm.

Nonlinear Optimization

A controller according to some embodiments of the present disclosure may use nonlinear optimization to determine the control variables. More specifically, the controller may utilize a nonlinear optimization algorithm, for example, to find economically optimal control variables to effectuate one or more changes to the electrical system to achieve economic efficiency (e.g., to operate the electrical system at as low a cost as may be possible, given the circumstances).

Nonlinear continuous optimization or nonlinear programming is similar to generalized continuous optimization and describes methods for optimizing continuous functions that may be nonlinear, or where the constraints may be nonlinear.

Multivariable Optimization

A controller according to some embodiments of the present disclosure may use multivariable optimization to determine the control variables. More specifically, the controller may utilize a multivariable optimization algorithm, for example, to find economically optimal control variables to effectuate one or more changes to the electrical system to achieve economic efficiency (e.g., to operate the electrical system at as low a cost as may be possible, given the circumstances).

In the examples of FIGS. 3 and 4, the considered equation $$f(x)=100(x_2-x_1^2)^2+(1-x_1)^2$$

is a multivariable equation. In other words, x is a set composed of more than one element. Therefore, the optimization algorithm is "multivariable." A subclass of optimization algorithms is the multivariable optimization algorithm that can find the minimum of f(x) when x has more than one element. Thus, the example of FIGS. 3 and 4 may illustrate solving for a generalized constrained continuous multivariable optimization problem.

Economically Optimizing Electrical System Controller

A controller, according to one embodiment of the present disclosure, will now be described to provide an example of using optimization to control an electrical system. An objective of using optimization may be to minimize the total electrical system operating cost during a period of time. For example, the approach of the controller may be to minimize the operating cost during an upcoming time domain, or future time domain, which may extend from the present time by some number of hours (e.g., integer numbers of hours, fractions of hours, or combinations thereof). As another example, the upcoming time domain, or future time domain, may extend from a future time by some number of hours. Costs included in the total electrical system operating cost may include electricity supply charges, electricity demand charges, a battery degradation cost, equipment degradation cost, efficiency losses, etc. Benefits, such as incentive payments, which may reduce the electrical system operating cost, may be incorporated (e.g., as negative numbers or values) or otherwise considered. Other costs may be associated with a change in energy in the ESS such that adding energy between the beginning and the end of the future time domain is valued. Other costs may be related to reserve energy in an ESS such as for backup power purposes. All of the costs and benefits can be summed into a net cost function, which may be referred to as simply the "cost function."

In certain embodiments, a control parameter set X can be defined (in conjunction with a control law) that is to be applied to the electrical system, how the electrical system should behave, and at what times in the future time domain they should be applied. In some embodiments, the cost function can be evaluated by performing a simulation of electrical system operation with a provided set X of control parameters. The control laws specify how to use X and the process variables to determine the control variables. The cost function can then be prepared or otherwise developed to consider the control parameter set X.

For example, a cost $f_c(X)$ may consider the control parameter values in X and return the scalar net cost of operating the electrical system with those control parameter values. All or part of the control parameter set X can be treated as a variable set $X_x$ (e.g., x as described above) in an optimization problem. The remaining part of X, $X_{logic}$, may be determined by other means such as logic (for example logic based on constraints, inputs, other control parameters, mathematical formulas, etc.). Any constraints involving $X_x$ can be defined, if so desired. Then, an optimization algorithm can be executed to solve for the optimal $X_x$. We can denote $X_{opt}$ as the combined $X_x$ and $X_{logic}$ values that minimize the cost function subject to the constraints, if any. Since $X_{opt}$ represents the control parameters, this example process fully specifies the control that will provide minimum cost (e.g., optimal) operation during the future time domain. Furthermore, to the limits of computing capability, this optimization can consider the continuous domain of possible $X_x$ values, not just a finite set of discrete possibilities. This example method continuously can "tune" possible control sets until an optimal set is found. As shorthand notation, we may refer to these certain example embodiments as an economically optimizing electrical system controller (EOESC).

Some of the many advantages of using an EOESC, according to certain embodiments, compared to other electrical system controllers are significant:

1) Any number of value streams may be represented in the cost function, giving the EOESC an ability to optimize on all possible value streams and costs simultaneously. As an example, generalized continuous optimization can be used to effectively determine the best control given both time of use (ToU) supply charge reduction and demand charge reduction simultaneously, all while still considering battery degradation cost.
2) With a sufficiently robust optimization algorithm, only the cost function, control law, and control parameter definitions need be developed. Once these three components are developed, they can be relatively easily maintained and expanded upon.
3) An EOESC can yield a true economically optimum control solution to machine or processor precision limited only by the cost function, control laws, and control parameter definitions.
4) An EOESC may yield not only a control to be applied at the present time, but also the planned sequence of future controls. This means one execution of an EOESC can generate a lasting set of controls that can be used into the future, rather than a single control to be applied at the present. This can be useful in case a) the optimization algorithm takes a significant amount of time to execute, or b) there is a communication interruption between the processor calculating the control parameter values and the processor interpreting the control parameters and sending control variables to the electrical system.

Figure 5:
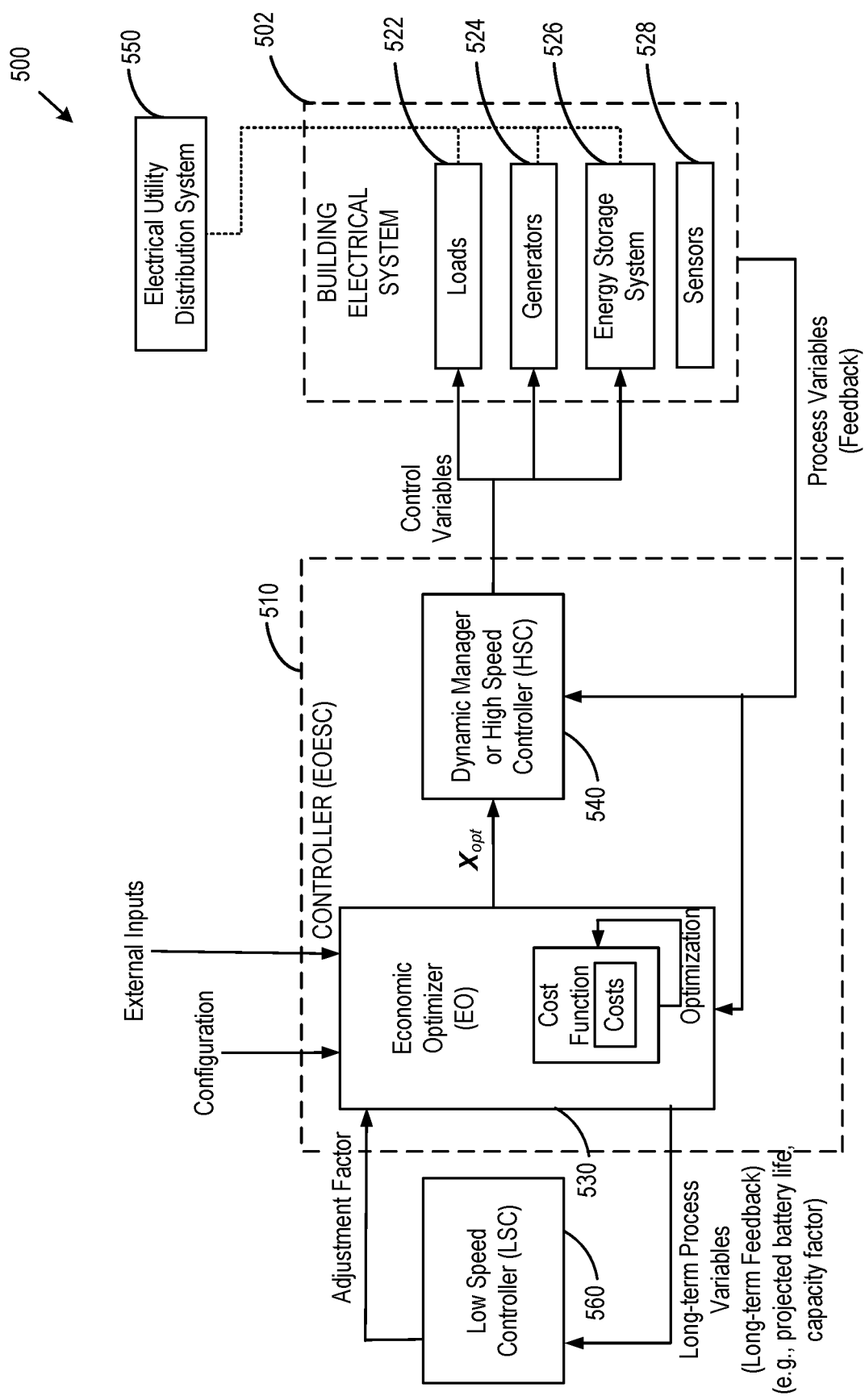
FIG. 5 is a block diagram illustrating a system architecture of a controllable electrical system, according to one embodiment of the present disclosure.

FIG. 5 is a control diagram of an electrical system 500, according to one embodiment of the present disclosure, including an EOESC 510 and a low speed controller (LSC) 560. Stated otherwise, FIG. 5 is a diagram of a system architecture of the electrical system 500 including the EOESC 510 and the LSC 560, according to one embodiment. The EOESC 510 may be an example of a short-term controller and may optimize the electrical system 500 according to short-term objectives using an optimization algorithm. The LSC 560 may be an example of a long-term controller and may adjust one or more adjustment factors or other parameters of the optimization algorithm to effectuate a change to the electrical system 500 to attempt to comply with the long-term objective.

The electrical system 500 comprises a building electrical system 502 that is controlled by the EOESC 510. The building electrical system 502 includes one or more loads 522, one or more generators 524, an energy storage system (ESS) 526, and one or more sensors 528 (e.g., meters) to provide measurements or other indication(s) of a state of the building electrical system 502. The building electrical system 502 is coupled to an electrical utility distribution system 550, and therefore may be considered on-grid. Similar diagrams can be drawn for other applications such as a photovoltaic generator plant and an off-grid building.

The EOESC 510 receives or otherwise obtains a configuration of the electrical system, external inputs, and process variables and produces control variables to be sent to the electrical system 502 to effectuate a change to the electrical system toward meeting a short-term controller objective for economical optimization of the electrical system, for example during an upcoming time domain. For example, the EOESC 510 may attempt to reduce demand of the electrical system 500 over a time segment of an upcoming time domain.

The EOESC 510 may include electronic hardware and software to process the inputs (e.g., the configuration of the electrical system, external inputs, and process variables) to determine values for each of the control variables. The EOESC 510 may include one or more processors and suitable storage media, which store programming in the form of executable instructions which are executed by the processors to implement the control processes.

In the embodiment of FIG. 5, the EOESC 510 includes an economic optimizer (EO) 530 and a dynamic manager (or high speed controller (HSC)) 540. The EO 530 according to some embodiments is presumed to have the ability to measure or obtain a current date and time. The EO 530 may determine a set of values for a control parameter set X and provide the set of values and/or the control parameter set X to the HSC 540. The EO 530 uses a generalized optimization algorithm to determine an optimal set of values for the control parameter set $X_{opt}$. The HSC 540 utilizes the set of values for the control parameter set X (e.g., an optimal control parameter set $X_{opt}$) to determine the control variables to communicate to the electrical system 502. The HSC 540 in some embodiments is also presumed to have the ability to measure or obtain a current date and time. The two-part approach of the EOESC 510, namely the EO 530 determining control parameters and then the HSC 540 determining the control variables, enables generation of a lasting set of controls, or a control solution (or plan) that can be used into the future rather than a single control to be applied at the present. Preparing a lasting control solution can be useful if the optimization algorithm takes a significant amount of time to execute. Preparing a lasting control solution can also be useful if there is a communication interruption between the calculating of the control parameter values and the processor interpreting the control parameters and sending control variables to the electrical system 502. The two-part approach of the EOESC 510 also enables the EO 530 to be disposed or positioned at a different location from the HSC 540. In this way, intensive computing operations that optimization may require can be performed by resources with higher processing capability that may be located remote from the building electrical system 502. These intensive computing operations may be performed, for example, at a data center or server center (e.g., in the cloud).

In some embodiments, a future time domain begins at the time the EO 530 executes and can theoretically extend any amount of time. In certain embodiments, analysis and experimentation suggest that a future time domain extent of 24 to 48 hours generates sufficiently optimal solutions in most cases. This amount of time may not be sufficient to properly optimize the electrical system 500 according to a long-term objective. Thus, the frequency at which the LSC 560 operates may be slower than the frequency at which the EOESC 510 operates. In other words, the LSC 560 and EOESC 510 may perform staggered optimizations.

As can be appreciated, the EOESC 510 of FIG. 5 may be arranged and configured differently than shown in FIG. 5, in other embodiments. For example, instead of the EO 530 passing the control parameter set $X_{opt}$ (the full set of control parameters found by a generalized optimization algorithm of the EO 530) to the HSC 540, the EO 530 can pass a subset of $X_{opt}$ to the HSC 540. Similarly, the EO 530 can pass $X_{opt}$ and additional control parameters to the HSC 540 that are not contained in $X_{opt}$. Likewise, the EO 530 can pass modified elements of $X_{opt}$ to the HSC 540. In one embodiment, the EO 530 finds a subset $X_x$ of the optimal X, but then determines additional control parameters $X_{logic}$, and passes $X_{logic}$ together with $X_x$ to the HSC 540. In other words, in this example, the $X_x$ values are to be determined through an optimization process of the EO 530 and the $X_{logic}$ values can be determined from logic. An objective of the EO 530 is to determine the values for each control parameter whether using optimization and/or logic.

For brevity in this disclosure, keeping in mind embodiments where X consists of independent ($X_x$) parameters and dependent ($X_{logic}$) parameters, when describing optimization of a cost function versus X, what is meant is variation of the independent variables $X_x$ until an optimum (e.g., minimum) cost function value is determined. In this case, the resulting $X_{opt}$ will consist of the combined optimum $X_x$ parameters and associated $X_{logic}$ parameters.

The LSC 560 may modify or generate adjustment factors or other parameters that modify the cost function of the EOESC 510. The LSC 560 may include a communication interface to receive one or more long-term feedback variables. The long-term feedback variables indicate to the LSC 560 a condition of the electrical system, the condition may include battery capacity loss, battery age, projected battery life, and/or a battery capacity factor. The long-term objective may extend over a larger period than one or more objectives of the EOESC 510. For example, the long-term objective may comprise controlling a lifespan of a battery in the ESS 526.

The LSC 560 may track the operating conditions of components of the electrical system 500 using the long-term feedback variables. The LSC 560 may determine a projected state of the electrical system 500 using the long-term feedback variables, and project a future state of components of the electrical system 500 based on the operating conditions The LSC 560 can compare the projected future state to a long-term objective. For example, the projected state of the electrical system 500 may comprise a projected lifespan of the battery of the ESS 526, and the long-term objective may include a desired battery life.

The LSC 560 can determine a relation between the projected state of the electrical system 500 and the one or more parameters/adjustment factors of the cost function associated with the long-term objective. The LSC 560 can use an optimization algorithm, machine learning, or test-driven equations to determine how an adjustment factor will affect the operating conditions and future state of the electrical system 500. In some embodiments, the parameter associated with the long-term objective comprises a capacity loss adjustment factor (CLAF). Thus, the LSC 560 can determine how the CLAF will affect the future or projected state of the electrical system 500. The CLAF is a decimal between 0 and 1, with 0 indicating that no battery costs will be accounted for during optimization and 1 indicating battery costs will be fully considered during optimization. Lowering the CLAF lowers the cost of battery degradation and increases battery use. Raising the CLAF raises the cost of battery degradation and decreases battery use.

The LSC 560 can adjust one or more parameters of the cost function based on the relation between the projected state of the electrical system 500 and the one or more parameters in order to effectuate a change to the electrical system 500 to attempt to comply with the long-term objective. For example, the parameter may be an adjustment factor and the LSC 560 may provide the adjustment factor to the EO. The LCS 560 may consider historical data in determining a relation between the projected state of the electrical system 500 and the one or more parameters associated with the long-term objective.

To determine how to adjust the parameters, the LSC 560 can simulate multiple values for the one or more parameters with a projected load for a future time period. The LSC 560 can adjust the parameters to a value of the multiple values that causes the electrical system 500 to more closely comply with the long-term objective.

The EOESC 510 and the LSC 560 may operate at different frequencies to accommodate the different lengths (or durations) of the objectives. For example, The LSC 560 may determine the adjustment factor fewer times than the EOESC 510 determines control variables. The LSC 550 may therefore provide the one or more adjustment factor parameters to the EO 530 less frequently than the EO 530 performs optimizations to determine one or more control values to provide to the electrical system 500. The EOESC 510 can reuse a previous adjustment factor until the LSC 560 provides a new adjustment factor.

In some embodiments, a long-term objective comprises a desired battery life. In these embodiments, the LSC 560 may generate or modify an adjustment factor that regulates battery usage. For example, the LSC 560 can modify the adjustment factor to discourage excessive battery use when the projected battery life is shorter than the desired battery life, and modify the adjustment factor to encourage battery use when the projected battery life is longer than the desired battery life.

In some embodiments, the EO 530 optimizes over a 25-hour or shorter time window. The EO 530 is not aware of rates, load predictions, and other decision variables outside of this time frame. The LSC 560 may be aware of decision variables outside of this time frame. Thus, while the most economically advantageous decisions will be made for the next 25 hours, this may not be the most economically advantageous decision to make long-term. The LSC 560 provides a way to keep the EO's objectives in line with any long-term objectives.

As explained above, a long-term objective can be a goal that extends beyond the upcoming time domain of an optimization problem, and thus cannot be represented as an objective of the EO 530. A long-term objective is thus not represented by any variables minimized/maximized by the EO 530 or outputted by the optimal solution, although it may contribute to the optimal solution. The long-term objective is represented as either an additional cost to the EO's cost function or as part of a variable within the cost function. For example, suppose the EO 530 minimizes a cost function by controlling power outputs. Long-term objectives could include regulating battery life, meeting an annual energy-use requirement, or maximizing a capacity factor incentive.

In one embodiment, the LSC 560, the EOESC 510, and one or more of their components are executed as software or firmware (for example stored on non-transitory media, such as appropriate memory) by one or more processors. For example, the EO 530 may comprise one or more processors to process the inputs and generate the set of values for the control parameter set X. Similarly, the HSC 540 may comprise one or more processors to process the control parameter set X and the process variables and generate the control variables. Similarly, the LSC 560 may comprise one or more processors to process the adjustment factor. The processors may be computers, microcontrollers, CPUs, logic devices, or any other digital or analog device that can operate on pre-programmed instructions. If more than one processor is used, they can be connected electrically, wirelessly, or optically to pass signals between one another. In addition, the control variables can be communicated to the electrical system components electrically, wirelessly, or optically or by any other means. The processor has the ability to store or remember values, arrays, and matrices, which can be viewed as multi-dimensional arrays, in some embodiments. This storage may be performed using one or more memory devices, such as read access memory (RAM), disk drives, etc.

Figure 6A:
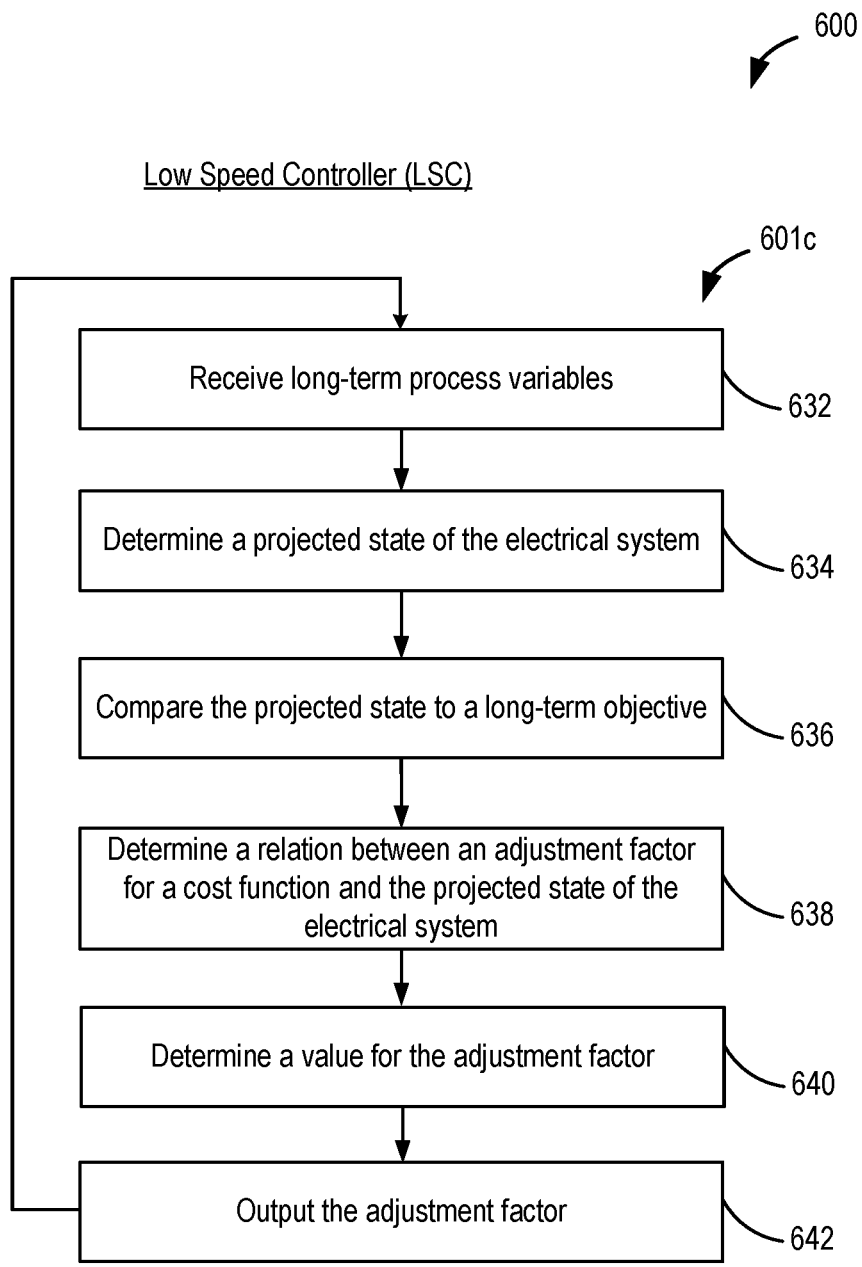
FIG. 6A is a flow diagram of a low speed controller (LSC) process.
Figure 6B:
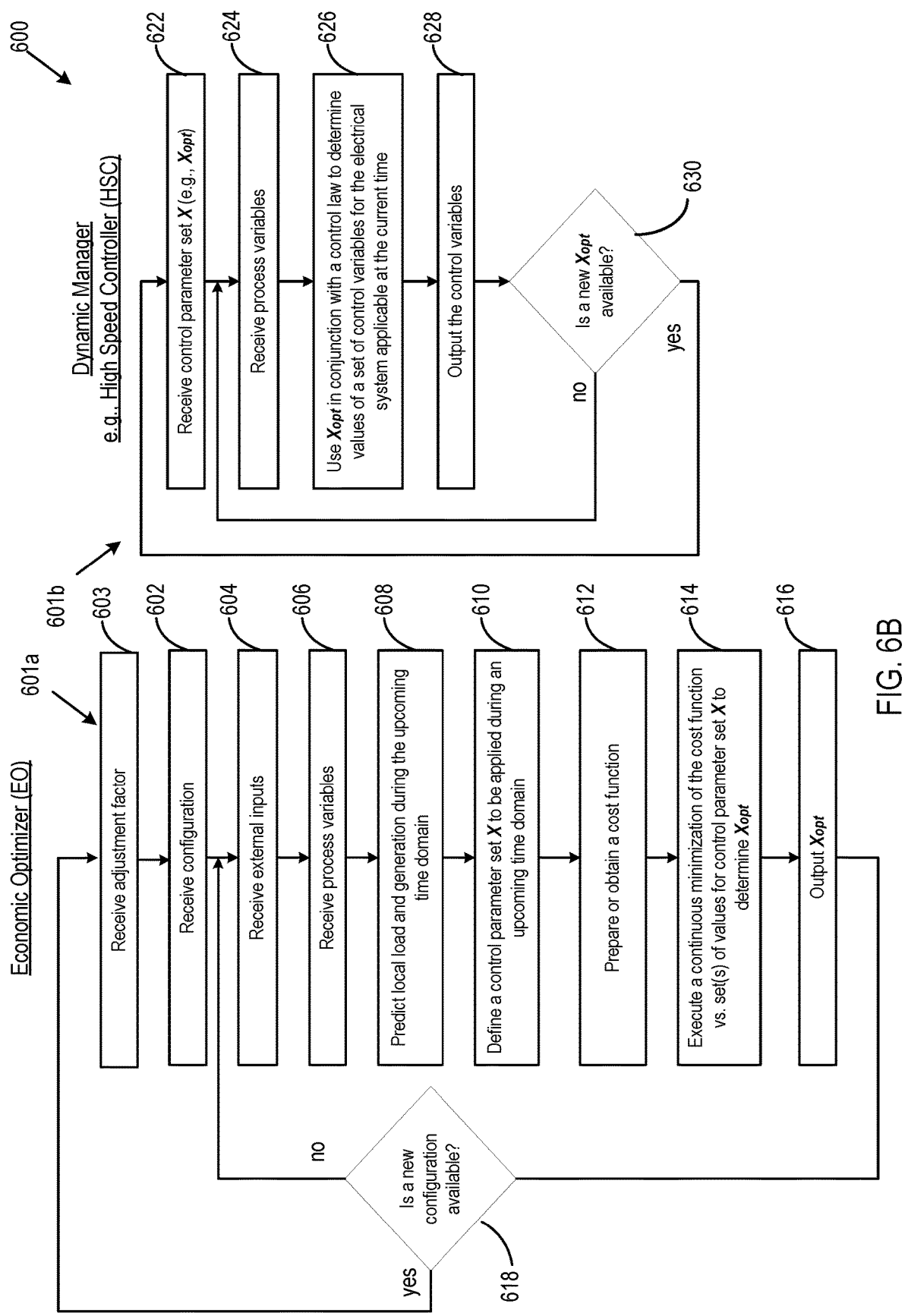
FIG. 6B is a flow diagram of a method or process of controlling an electrical system, according to one embodiment of the present disclosure.

FIGS. 6A-6B illustrate flow diagrams of a method 600 or process of controlling an electrical system based on a long-term objective, according to one embodiment of the present disclosure.

The method 600 includes three separate processes, namely a low speed controller (LSC) process 601*c* (FIG. 6A), an economic optimizer (EO) process 601*a* (FIG. 6B), and a high speed controller (HSC) process 601*b* (FIG. 6B).

FIG. 6A illustrates a flow diagram of an LSC process 601*c*. The LSC process 601*c* of FIG. 6A may execute separate from, or even independent from the EO process 601*a* (FIG. 6B) and the HSC process 601*b* (FIG. 6B). Because the LSC process 601C can run separate and distinct from the EO process 601*a* (FIG. 6B) and the HSC process 601*b* (FIG. 6B), the execution of these processes 601*a*, 601*b*, 601*c* may be collocated on a single system or isolated on remote systems. Additionally, how frequently each process runs may be independent. For example, the LSC process 601*c* can perform its operations less frequently than the EO process 601*a* (FIG. 6B) and the HSC process 601*b* (FIG. 6B). The LSC process 601*c* could run on a slow loop time step (e.g., every day, week, or month) while the EO process 601*a* (FIG. 6B) and the HSC process 601*b* (FIG. 6B) can perform cost optimization for the next 25 hours every 15 minutes.

The LSC process 601*c* may be a computer-implemented process executed by one or more computing devices, such as the LSC 560 of FIG. 5. The LSC may receive 632 long-term process variables. The long-term process variables may be feedback variables and may include battery capacity loss, battery age, projected battery life, and/or a battery capacity factor. The LSC can determine 634 projected state of the electrical system. For example, the LSC can determine the battery capacity after a certain number of years. The LSC can compare 636 the projected state to a long-term objective. For example, the LSC can compare battery capacity after a certain number of years to a target battery lifetime.

The LSC can determine 638 a relation between an adjustment factor for a cost function and the projected state of the electrical system. The long-term feedback variables may be used in a multitude of ways to control the parameters, including optimization, machine learning, or simple test-driven equations. The LSC may determine 640 a value for the adjustment factor based on this relationship to effectuate a change to the electrical system to attempt to comply with a long-term objective. The LSC 638 can output 642 the adjustment factor to the EO to be incorporated into the cost function.

FIG. 6B illustrates a flow diagram of an EO process 601*a*, and an HSC process 601*b*. The HSC process 601*b* may also be referred to herein as a dynamic manager process 601*b*. The HSC process 601*b* may utilize a control parameter set X determined by the EO process 601*a*. Nevertheless, the HSC process 601*b* may execute separate from, or even independent from, the EO process 601*a*, based on a control parameter set X determined at an earlier time by the EO process 601*a*. Because the EO process 601*a* can run separate and distinct from the HSC process 601*b*, the execution of these processes 601*a*, 601*b* may be collocated on a single system or isolated on remote systems.

The EO process 601*a* may be a computer-implemented process executed by one or more computing devices, such as the EO 530 of FIG. 5. The EO process 601*a* may receive 603 an adjustment factor from the LSC process 601*c*. The adjustment factor may modify a value of a cost function to cause the electrical system to align with a long-term objective. The EO process 601*a* may receive 602 a configuration, or a set of configuration elements, of the electrical system. The configuration may specify one or more constraints of the electrical system. The configuration may specify one or more constants of the electrical system. The configuration may specify one or more cost elements associated with operation of the electrical system. The cost elements may include one or more of an electricity cost (e.g., an electricity supply charge, an electricity demand charge), a battery degradation cost, an equipment degradation cost, a tariff definition (e.g., an electricity supply tariff providing ToU supply rates and associated time windows, or an electricity demand tariff providing demand rates and associated time windows), a cost of local generation, penalties associated with deviation from an operating plan (e.g., a prescribed operating plan, a contracted operating plan), costs or benefits associated with a change in energy in the ESS such that adding energy between the beginning and the end of the future time domain is valued, costs or benefits (e.g., a payment) for contracted maneuvers, costs or benefits associated with the amount of energy stored in an ESS as a function of time, and a value of comfort that may be a function of other process variables such as building temperature.

In certain embodiments, the set of configuration elements define the one or more cost elements by specifying how to calculate an amount for each of the one or more cost elements. For example, the definition of a cost element may include a formula for calculating the cost element.

In certain embodiments, the cost elements specified by the configuration elements may include one or more incentives associated with operation of the electrical system. An incentive may be considered as a negative cost. The one or more incentives may include one or more of an incentive revenue, a demand response revenue, a value of reserve energy or battery capacity (e.g., for backup power as a function of time), a contracted maneuver, revenue for demand response opportunities, revenue for ancillary services, and revenue associated with deviation from an operating plan (e.g., a prescribed operating plan, a contracted operating plan).

In other embodiments, the configuration elements may specify how to calculate an amount for one or more of the cost elements. For example, a formula may be provided that indicates how to calculate a given cost element.

External inputs may also be received 604. The external inputs may provide indication of one or more conditions that are external to the controller and/or the electrical system. For example, the external inputs may provide indication of the temperature, weather conditions (e.g., patterns, forecasts), and the like.

Process variables are received 606. The process variables provide one or more measurements of a current state of the electrical system. The set of process variables can be used to determine progress toward meeting an objective for economical optimization of the electrical system. The process variables may be feedback in a control loop for controlling the electrical system.

The EO process 601a may include predicting 608 a local load and/or generation during an upcoming time domain. The predicted local load and/or local generation may be stored for later consideration. For example, the predicted load and/or generation may be used in a later process of evaluating the cost function during a minimization of the cost function.

A control parameter set X may be defined 610 to be applied during an upcoming time domain. In defining the control parameter set X, the meaning of each element of X is established. A first aspect in defining 610 the control parameter set X may include selecting a control law. Then, for example, X may be defined 610 as a matrix of values such that each column of X represents a set of control parameters for the selected control law to be applied during a particular time segment of the future time domain. In this example, the rows of X represent individual control parameters to be used by the control law. Further to this example, the first row of X can represent the nominal ESS power during a specific time segment of the future time domain. Likewise, X may be further defined such that the second row of X is the maximum demand limit (e.g., a maximum demand setpoint). A second aspect in defining 610 may include splitting the upcoming time domain into sensible segments and selecting the meaning of the control parameters to use during each segment. The upcoming future time domain may be split into different numbers of segments depending on what events are coming up during the future time domain. For example, if there are no supply charges and there is only one demand period, the upcoming time domain may be split into a few segments. The few segments may correlate to before the demand period, during the demand period, and after the demand period. But if there is a complicated scenario with many changing rates and constraints, the upcoming time domain may be split into many segments. Lastly, in defining 610 the control parameters X, some control parameters $X_x$ may be marked for determination using optimization, and others $X_{logic}$ may be marked for determination using logic (for example, logic based on constraints, inputs, other control parameters, mathematical formulas, etc.).

The EO process 601a may also prepare 612 or obtain a cost function. Preparing 612 the cost function may be optional and can increase execution efficiency by pre-calculating certain values that will be needed each time the cost function is evaluated. The cost function may be prepared 612 (or configured) to include or account for any constraints on the electrical system. The cost function can include the adjustment factor from the LSC to account for costs associated with long-term objectives.

With the control parameter set X defined 610 and the cost function prepared 612, the EO process 601a can execute 614 a minimization or optimization of the cost function resulting in the optimal control parameter set $X_{opt}$. For example, a continuous optimization algorithm may be used to identify an optimal set of values for the control parameter set $X_{opt}$ (e.g., to minimize the cost function) in accordance with the one or more constraints and the one or more cost elements. The continuous optimization algorithm may be one of many types. For example, it may be a generalized continuous optimization algorithm. The continuous optimization algorithm may be a multivariable continuous optimization algorithm. The continuous optimization algorithm may be a constrained continuous optimization algorithm. The continuous optimization algorithm may be a Newton-type algorithm. It may be a stochastic-type algorithm such as Covariance Matrix Adaption Evolution Strategy (CMAES). Other algorithms that can be used are BOBYQA (Bound Optimization by Quadratic Approximation) and COBYLA (Constrained Optimization by Linear Approximation).

To execute the optimization of the cost function, the cost function may be evaluated many times. Each time, the evaluation may include performing a simulation of the electrical system operating during the future time domain with a provided control parameter set X, and then calculating the cost associated with that resulting simulated operation. The cost function may include or otherwise account for the one or more cost elements received 602 in the configuration. For example, the cost function may be a summation of the one or more cost elements (including any negative costs, such as incentive, revenues, and the like). In this example, the optimization step 614 would find $X_{opt}$ that minimizes the cost function. The cost function may also include or otherwise account for the one or more constraints on the electrical system. The cost function may include or otherwise account for any values associated with the electrical system that may be received 602 in the configuration.

The cost function may also evaluate another economic metric such as payback period, internal rate of return (IRR), return on investment (ROI), net present value (NPV), or carbon emission. In these examples, the function to minimize or maximize would be more appropriately termed an "objective function." In case the objective function represents a value that should be maximized, such as IRR, ROI, or NPV, the optimizer should be set up to maximize the objective function when executing 614, or the objective function could be multiplied by −1 before minimization. Therefore, as can be appreciated, elsewhere in this disclosure, "minimizing" the "cost function" may also be more generally considered for other embodiments as "optimizing" an "objective function."

The continuous optimization algorithm may execute the cost function (e.g., simulate the upcoming time domain) a plurality of times with various parameter sets X to identify an optimal set of values for the control parameter set $X_{opt}$ to minimize the cost function. The cost function may include a summation of the one or more cost elements, and evaluating the cost function may include returning a summation of the one or more cost elements incurred during the simulated operation of the control system over the upcoming time domain.

The optimal control parameter set $X_{opt}$ is then output 616. In some embodiments, the output 616 of the optimal control parameter set $X_{opt}$ may be stored locally, such as to memory, storage, circuitry, and/or a processor disposed local to the EO process 601a. In some embodiments, the outputting 616 may include transmission of the optimal control parameter set $X_{opt}$ over a communication network to a remote computing device, such as the HSC 540 of FIG. 5.

The EO process 601a repeats for a next upcoming time domain (a new upcoming time domain). A determination 618 is made whether a new configuration is available. If yes, then the EO process 601a receives 602 the new configuration and determines if there is a new adjustment factor. If no, then the EO process 601a may skip receiving 602 the configuration and simply receive 604 the external inputs.

As can be appreciated, in other embodiments an EO process may be configured differently, to perform operations in a differing order, or to perform additional and/or different operations. In certain embodiments, an EO process may determine values for a set of control variables to provide to the electrical system to effectuate a change to the electrical system toward meeting the controller objective for economical optimization of the electrical system during an upcoming time domain, rather than determining values for a set of control parameters to be communicated to an HSC process. The EO process may provide the control variables directly to the electrical system, or to an HSC process for timely communication to the electrical system at, before, or during the upcoming time domain.

The HSC process 601b may be a computer-implemented process executed by one or more computing devices, such as the HSC 540 of FIG. 5. The HSC process 601b may receive 622 a control parameter set X, such as the optimal control parameter set $X_{opt}$ output 616 by the EO process 601a. Process variables are also received 624 from the electrical system. The process variables include information, or feedback, about a status (e.g., a current state, condition, or operating condition) of the electrical system and/or one or more components therein.

The HSC process 601b determines 626 values for a set of control variables for controlling one or more components of the electrical system at the current time. The HSC process 601b determines 626 the values for the control variables by using the optimal control parameter set $X_{opt}$ in conjunction with a control law. The control laws specify how to determine the control variables from X (or $X_{opt}$) and the process variables. Stated another way, the control law enforces the definition of X. For example, for a control parameter set X defined such that a particular element, $X_i$, is an upper bound on demand to be applied at the present time, the control law may compare process variables such as the unadjusted demand to $X_i$. If unadjusted building demand exceeds $X_i$, the control law may respond with a command (in the form of a control variable) to instruct the ESS to discharge at a rate that will make the adjusted demand equal to or less than $X_i$.

The control variables (including any newly determined values) are then output 628 from the HSC process 601b. The control variables are communicated to the electrical system and/or one or more components therein. Outputting 628 the control variables may include timely delivery of the control variables to the electrical system at, before, or during the upcoming time domain and/or applicable time segment thereof. The timely delivery of the control variables may include an objective to effectuate a desired change or adjustment to the electrical system during the upcoming time domain.

A determination 630 is then made whether a new control parameter set X (and/or values thereof) is available. If yes, then the new control parameter set X (or simply the values thereof) is received 622 and HSC process 601b repeats. If no, then the HSC process 601b repeats without receiving 622 a new control parameter set X, such as a new optimal control parameter set $X_{opt}$.

As can be appreciated, in other embodiments an HSC process may be configured differently, to perform operations in a differing order, or to perform additional and/or different operations. For example, in certain embodiments, an HSC process may simply receive values for the set of control variables and coordinate timely delivery of appropriate control variables to effectuate a change to the electrical system at a corresponding time segment of the upcoming time domain.

The example embodiment of an EOESC 510 in FIG. 5 and a control method 600 in FIGS. 6A-B illustrate a two-piece or staged controller, which splits a control problem into two pieces (e.g., a low speed optimizer and a high speed dynamic manager (or high speed controller (HSC)). The two stages or pieces of the controller, namely an optimizer and a dynamic manager, are described more fully in the sections below. Nevertheless, as can be appreciated, in certain embodiments a single-stage approach to a control problem may be utilized to determine optimal control values to command an electrical system.

Economic Optimizer (EO)

Greater detail will now be provided about some elements of an EO, according to some embodiments of the present disclosure.

Predicting a Load/Generation of an Upcoming Time Domain

In many electrical system control applications, a load of the electrical system (e.g., a building load) changes over time. Load can be measured as power or as energy change over some specified time period, and is often measured in units of kW. As noted above with reference to FIG. 6B, an EO process 601a may predict 608 a local load and/or generation during an upcoming time domain. The prediction may be performed using various techniques. For example, the EO process 601a may predict 608 a local load and/or generation during an upcoming time domain by scaling and offsetting historic values, simulating loads and generation, using a Kalman filter, using stochastic prediction, or performing iterative and recursive signal processing methods.

Figure 7:
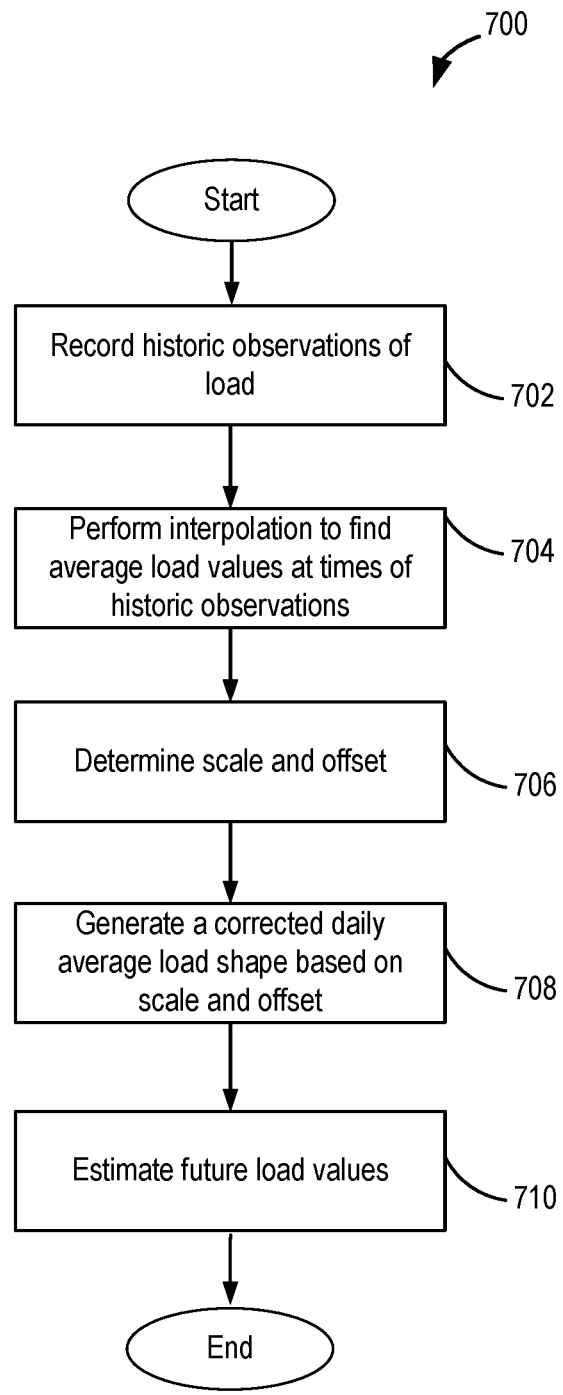
FIG. 7 is a flow diagram of a method of predicting load and/or generation of an electrical system during an upcoming time domain, according to one embodiment of the present disclosure.
Figure 8:
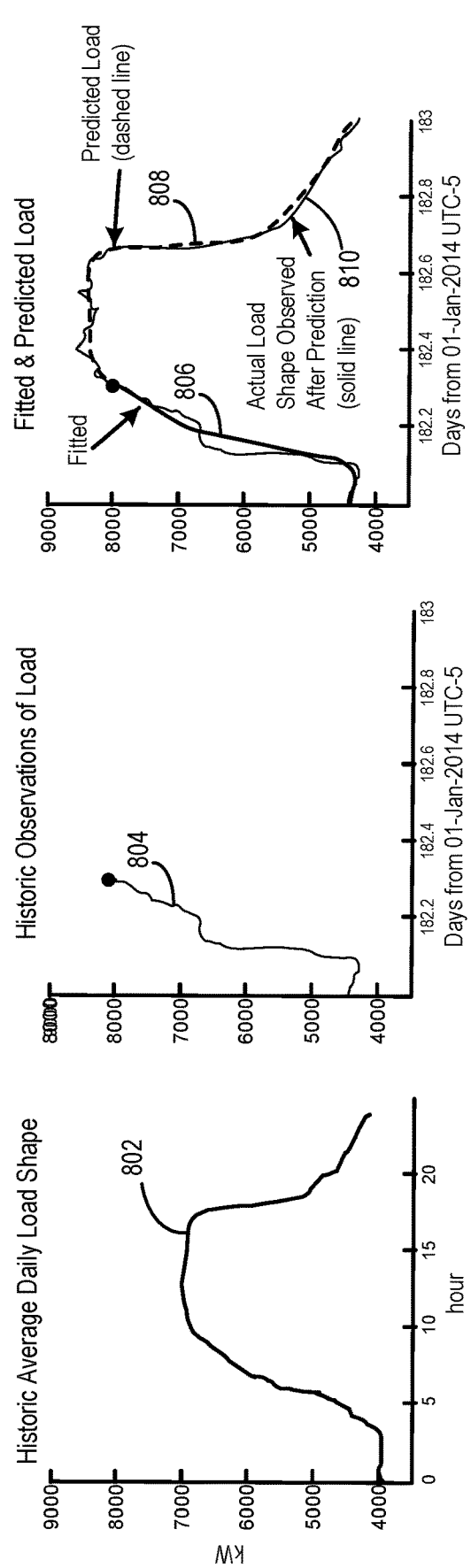
FIG. 8 is a graphical representation of predicting load and/or generation of an electrical system during an upcoming time domain.

FIGS. 7 and 8 illustrate one example embodiment of how, an EO process 601a may predict 608 a local load and/or generation during an upcoming time domain FIG. 7 is a flow diagram of a method 700 of predicting load and/or generation of an electrical system during an upcoming time domain, according to one embodiment. A controller, according to some embodiments of the present disclosure, may have the ability to predict the changing load that may be realized during an upcoming time domain. These load and generation predictions may be used when the cost function is evaluated. To account for and reap a benefit from some types of value streams such as demand charge reduction, an accurate estimate of the upcoming load can be important. An accurate projection of a load during an upcoming time domain enables an EO to make better control decisions to capitalize on value streams such as demand charge reduction.

A method of predicting load, according to one embodiment of the present disclosure, may perform a load prediction considering historic periodic trends or shapes such as a daily trend or shape. The load prediction can execute every time an EO executes an EO process, or it can execute more or less frequently. The load prediction may be executed by performing a regression of a parameterized historic load shape against historic load data (typically less than or equal to 24 hours) in one embodiment. Regression algorithms such as least squares may be used. A compilation of historic trends may be recorded as a historic average (or typical) profile or an average load shape. The historic average profile or average load shape may be a daily (24-hour) historic average profile that represents a typical day. The compilation of historic observations and/or historic average profile may be received from another system, or may be gathered and compiled (or learned) as part of the method of predicting load, as will be explained below with reference to FIG. 8.

Referring to FIG. 7, historic observations of load are recorded 702. For example, the last h hours of historic observations of load may be continuously recorded and stored in memory, each measurement having a corresponding time of day at which time it was measured in an array pair historic_load_observed and historic_load_observed_time_of_day. The last h hours can be any amount of time, but in one embodiment, it is between 3 and 18 hours.

Assume for now that a daily average load shape array or vector is in memory named avg_load_shape, with a corresponding array avg_load_shape_time_of_day of the same length. The avg_load_shape and avg_load_shape_time_of_day represent a historic average profile and/or historic trends. The time domain of avg_load_shape_time_of_day is 24 hours, and the time interval of discretization of avg_load_shape_time_of_day could be any value. Between 5 and 120 minutes may be used, depending on the application, in some embodiments. As an example, if the interval of discretization is chosen to be 30 minutes, there will be 48 values comprising avg_load_shape and 48 values comprising avg_load_shape_time_of_day.

An interpolation is performed 704 to find the avg_load_shape values at each of the times in historic_load_observed_time_of_day. Call this new interpolated array avg_load_shape_interpolated. Consider mathematically avg_load_shape_interpolated with a scale and offset defined as: average_load_shape_interpolated_p=avg_load_shape_interpolated*scale+offset. In some embodiments, the interpolation is a linear interpolation. In other embodiments, the interpolation is a nonlinear interpolation.

A scale and offset are determined 706. For example, the method 700 may perform a least squares regression to determine 706 scale and offset that minimize the sum of the squares of the error between average_load_shape_interpolated_p and historic_load_observed. Call these resulting scale and offset values scale_fit and offset_fit. In some embodiments, the determining 706 of scale and offset can utilize weighted least squares techniques that favor more recent observations.

A corrected daily average load shape is generated 708 based on the scale and/or offset. For example, a corrected load shape may be generated 708 for a full day as avg_load_shape_fit=avg_load_shape*scale_fit+offset_fit.

The future load values can then be estimated 710, such as by interpolating. A future load value at any time of day in the future time domain can now be estimated by interpolating 704 to that time of day from the pair of arrays avg_load_shape_fit and avg_load_shape_time_of_day.

FIG. 8 provides a graphical representation 800 of predicting load and/or generation of an electrical system during an upcoming time domain, according to one embodiment. The graphical representation may track the method 700 of FIG. 7. A historic average daily load shape 802 is generated or learned. Historic observations of load 804 are generated. A fitted current-day historic load shape 806 is generated. A predicted load shape 808 can then be generated. The predicted load shape 808 is fairly accurate based on an actual load shape observed 810.

One advantage of a method of predicting load and/or generation of an electrical system during an upcoming time domain, such as previously described, compared to other methods, is that such method can adapt to changes in load scale and offset while still conforming to the general expected average daily load shape.

In other embodiments, the predicted load can be further modified after it has been calculated with the above method. For example, the predicted load may be modified to bring it closer to the daily average historic load as the prediction time becomes farther away from the time the prediction was made.

As mentioned previously, in certain embodiments, a method of predicting load may include compiling or otherwise gathering historic trends to determine a historic average profile or an average load shape on a typical day. One possible method for load learning (e.g., determining and updating avg_load_shape) is as follows:

1) Create arrays avg_load_shape and avg_load_shape_time_of_day, which are defined as above. Initialize avg_load_shape to some reasonable value such as a constant load equal to the current load, or to an initial load shape provided in the configuration information.
2) Begin recording load observations and storing each along with its associated time of day in historic_load_observed_2 and historic_load_observed_time_of_day_2.
3) After at least one full day of load observations has been stored in historic_load_observed_2 and historic_load_observed_time_of_day_2, assign the last 24 hours of load data in historic_load_observed_2 to a temporary array in memory named avg_load_shape_last_24_hr, which has the same number of elements as avg_load_shape, and whose associated time-of-day vector is also avg_load_shape_time_of_day. To perform this operation, a number of well-known approaches can be used, including regression and interpolation, linear weighted averaging, and nearest neighbor.

4) Assign avg_load_shape_last_24_hr to avg_load_shape.
5) Wait for a new 24-hour period of data to be recorded in historic_load_observed_2 and historic_load_observed_time_of_day_2.
6) Again assign the last 24 hours of load data in historic_load_observed_2 to a temporary array in memory named avg_load_shape_last_24_hr, which has the same number of elements as avg_load_shape, and whose associated time-of-day vector is also avg_load_shape_time_of_day. Again to perform this operation, a number of well-known approaches can be used, including regression and interpolation, linear weighted averaging, and nearest neighbor.
7) Update each element k of avg_load_shape by performing a digital filter operation with it and avg_load_shape_last_24_hr. In one embodiment, this digital filter operation is performed as a first-order infinite impulse response (IIR) filter with the inputs being elements k of avg_load_shape_last_24_hr and the original avg_load_shape, and the output being a modified element k of avg_load_shape. In one embodiment, the time constant of the first-order IIR filter is set to between 2 and 60 days. Other types of digital filters, including low-pass digital filters, may be used.
8) Return to 5 above.

Some unique advantages of this embodiment of learning and predicting load and/or generation are obtained. For example, previous load information to construct an average daily load shape is not required. This embodiment learns the average daily load shape day-by-day as it observes the actual load. It requires very little memory: only enough for 24 hours of observed load, the load shape itself (24 hours), and supporting arrays and scalar values. Due to the filtering described above, it allows the load shape to change seasonally as seasonal changes occur and are observed. In other words, it is adaptive.

The method of FIG. 7 and illustration of FIG. 8 describe one embodiment of a method for predicting load. If a local generator is present in an electrical system, the same or a similar method can be applied for predicting generation. Instead of a "load shape," a "generation shape" can be stored in memory. For generators where the generation is known at a particular time (such as a photovoltaic generator which would be expected to have nearly zero generation at nighttime), the prediction and generation shape can be constrained to specific values at specific times of the day. In this case, instead of using regression to determine both scale and offset, perhaps only scale may be needed.

Another aspect of this embodiment of a method to predict load and/or generation is the ability to incorporate external inputs to modify the prediction of load or generation. In one embodiment, the prediction is made as already described, then the prediction is modified with the use of external information such as a weather forecast or building occupancy forecast.

By having a pre-determined differential relationship for load (or generation) versus input data, the prediction can be modified in one example as follows:
1) An external input is read which contains a forecasted variable $x_{input,forecast}$.
2) From configuration information, a value of the differential $$\left[\frac{d(\text{load})}{d(x_{input})}\right]_{x_{nom}}$$

is available which is valid near some nominal $x_{input}$ value of $x_{nom}$.
3) The predicted load can be modified to account for the difference between the input $x_{input}$ and $x_{nom}$:

$$load_{predicted,modified} = load_{predicted} + (x_{input,forecast} - x_{nom}) \times \left[\frac{d(\text{load})}{d(x_{input})}\right]_{x_{nom}}$$

The same approach can be used for modifying a generation prediction by replacing "load" with "generation" in the formula above.

Define the Control Parameter Set X

Defining the Control Parameter Set X involves defining or otherwise specifying times at which each control parameter is to be applied during a future time domain, and the control law(s) that are to be applied at each time in the future time domain.

An EO, according to certain embodiments of the present disclosure, is configured to define the control parameter set X. While there are many ways to define a control parameter set X three possible approaches are:
1. a single set of parameters of a control law to be applied during the entire upcoming time domain;
2. a sequence of parameter sets that are each to be applied to a single control law at different contiguous sequential time intervals throughout the upcoming time domain; and
3. a sequence of parameters that specifies different control laws to be applied at different contiguous sequential time intervals throughout the future time domain.

An example of Approach 1 above of a single set of parameters of the control parameter set X (and example values) for a four-parameter control law is shown in Table 1.

TABLE 1

| Parameter | Description | Example Value |
|---|---|---|
| $P_{nom}$ | Nominal ESS power (or discharge power if negative) to be applied in the absence of other constraints or rules (such as those related to UB, $UB_0$, or LB below). | −40 W |
| UB | Upper bound on adjusted demand (e.g., an upper setpoint). Not to be exceeded unless the ESS is incapable of discharging at sufficient power. | 100 kW |
| $UB_0$ | Upper bound on electrical system adjusted demand (e.g., an upper setpoint). Not to be actively exceeded (e.g., electrical system adjusted demand may exceed this value only with ESS power less than or equal to 0). | 80 kW |
| LB | Lower bound on adjusted net power (e.g., a lower setpoint). Sometimes referred to as "minimum import" or, if 0, "zero export." Adjusted net power will be kept above this value unless the ESS is incapable of charging at sufficient power and generators cannot be throttled sufficiently. | 0 kW |

Approaches 2 and 3 above utilize segmentation of the future time domain.

Figure 9:
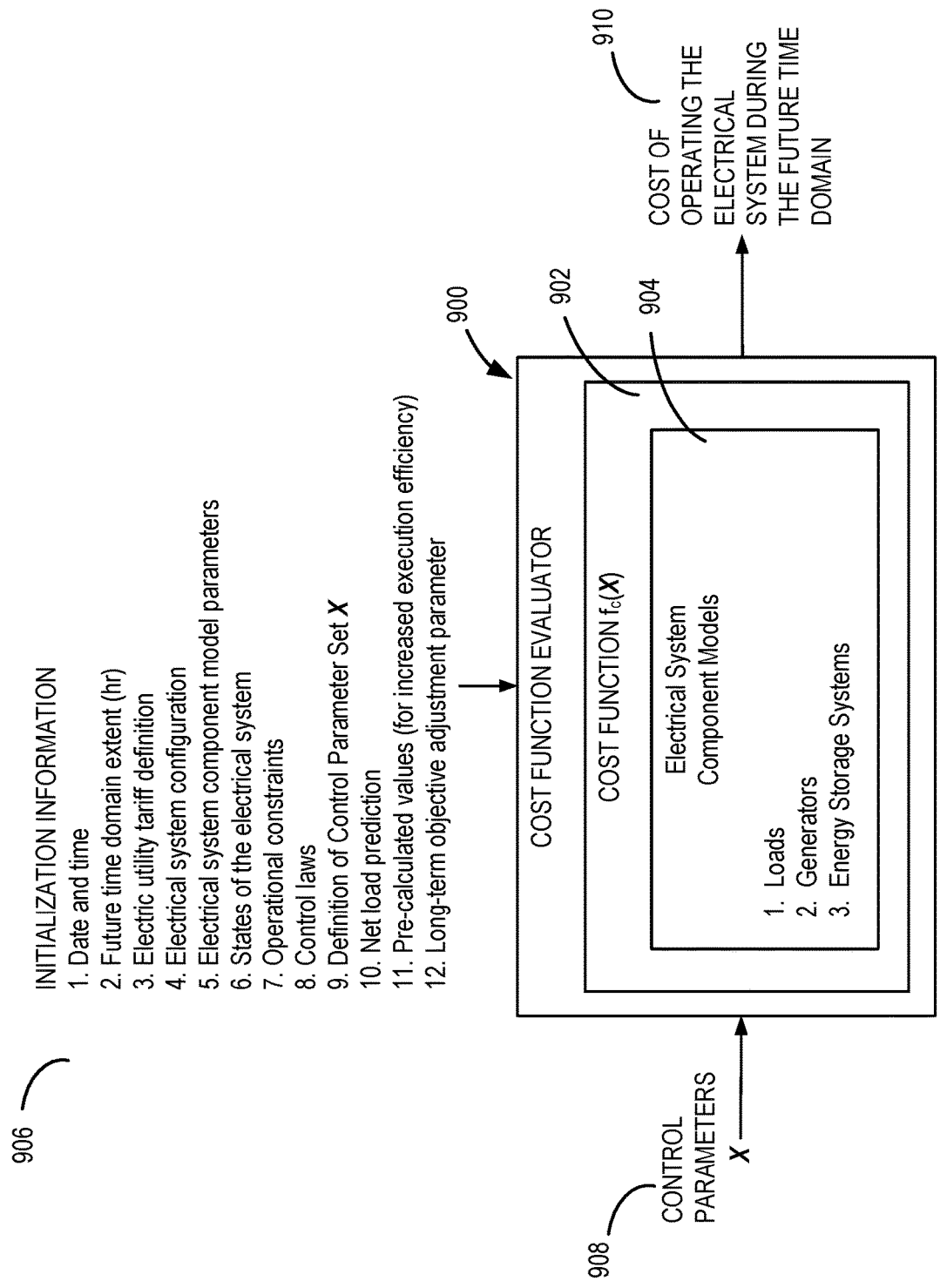
FIG. 9 is a diagrammatic representation of a cost function evaluation module, according to one embodiment of the present disclosure.

FIG. 9 is a diagrammatic representation of a cost function evaluation module 900 (or cost function evaluator) that implements a cost function $f_c(X)$ 902 that includes models 904 for one or more electrical system components (e.g., loads, generators, ESSs). The cost function $f_c(X)$ 902 receives as inputs initialization information 906 and control parameters 908 (e.g., a control parameter set X). The cost function $f_c(X)$ 902 provides as an output a scalar value 910 representing a cost of operating the electrical system during the future time domain.

The scalar value 910 representing the cost, which is the output of the cost function $f_c(X)$ 902, can have a variety of different units in different examples. For example, it can have units of any currency. Alternatively, the cost can have units of anything with an associated cost or value, such as electrical energy or energy credits. The cost can also be an absolute cost, a cost per future time domain, or a cost per unit time such as cost per day. In one embodiment, the units of cost are U.S. dollars per day.

Prior to using the cost function $f_c(X)$ 902, several elements of it can be initialized. The initialization information 906 that is provided in one embodiment is:

Date and time. This information is used to determine the applicable electric utility rates.

Future time domain extent. This defines the time extent of the cost calculation.

Electric utility tariff definition. This is a set of parameters that defines how the electrical utility calculates charges.

Electrical system configuration. These configuration elements specify the sizes and configuration of the components of the electrical system. An example for a battery ESS is the energy capacity of the energy storage device.

Electrical system component model parameters. These model parameters work in conjunction with analytic or numerical models to describe the physical and electrical behavior and relationships governing the operation of electrical components in the electrical system. For battery ESSs, a "battery model" is a component, and these parameters specify the properties of the battery such as its Ohmic efficiency, Coulombic efficiency, and degradation rate as a function of its usage.

States of the electrical system. This information specifies the state of components in the electrical system that are important to the economic optimization. For battery ESSs, one example state is the SoC of the energy storage device.

Operational constraints. This information specifies any additional operational constraints on the electrical system, such as minimum import power.

Control law(s). The control law or laws are associated with the definition of X.

Definition of control parameter set X. This may indicate the times at which each control parameter is to be applied during a future time domain and may indicate which control law(s) are to be applied at each time in the future time domain.

Net load (or power) prediction. This is the predicted unadjusted net load (or predicted unadjusted net power) during the future time domain.

Pre-calculated values. While segments are defined, many values may be calculated that the cost function can use to increase execution efficiency (help it "evaluate" faster). Pre-calculation of these values may be a desirable aspect of preparing the cost function to enable the cost function to be evaluated more efficiently (e.g., faster, with fewer resources).

Long-term objective adjustment parameter. The cost function may be focused on short-term goals, like economical optimization over the next several hours. The long-term objective adjustment parameter may account for objectives that extend beyond the short-term goals.

Preparing the cost function $f_c(X)$ 902 can increase execution efficiency of the EO because values that would otherwise be re-calculated each time the cost function is evaluated (possible thousands of times per EO iteration) are pre-calculated a single time.

Figure 10:
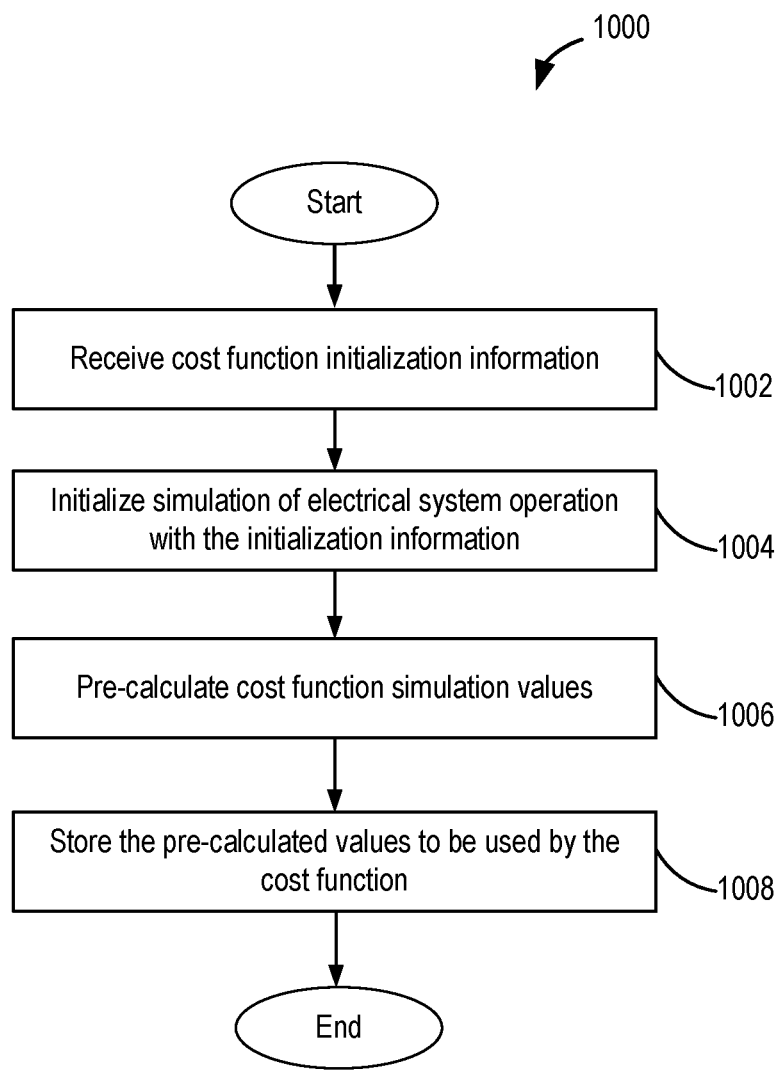
FIG. 10 is a flow diagram of a method of preparing a cost function fc(X), according to one embodiment of the present disclosure.

FIG. 10 is a flow diagram of a process 1000 of preparing a cost function $f_c(X)$, according to one embodiment of the present disclosure. Cost function initialization information may be received 1002, including any long-term adjustment factor. A simulation of electrical system operation is initialized 1004 with the received 1002 cost function initialization information. Cost function values may be pre-calculated 1006. The pre-calculated values may be stored 1008 for later use during evaluation of the cost function.

In certain embodiments, defining a control parameter set X and preparing a cost function $f_c(X)$ may be accomplished in parallel.

Evaluation of the Cost Function

During execution of an EO, according to some embodiments of the present disclosure, the cost function is evaluated. During evaluation of the cost function, operation of the electrical system with the control parameter set X is simulated. The simulation may be an aspect of evaluating the cost function. Stated otherwise, one part of evaluating the cost function for a given control parameter set X may be simulating operation of the electrical system with that given control parameter set X. In the simulation, the control parameter set X is applied to the predicted load and predicted power generation to get an adjusted load and a simulation of operation of the electrical system over the future time domain. As time advances through the future time domain in the simulation, costs and benefits (as negative costs) can be accumulated.

What is finally returned by the simulation is a representation of how the electrical system state may evolve during the future time domain with control X, and what costs may be incurred during that time.

In some embodiments, the cost function, when evaluated, returns the cost of operating the electrical system with some specific control parameter set X. As can be appreciated, the cost of operating an electrical system may be very different depending on X. So evaluation of the cost function includes a simulated operation of the electrical system with X first. The result of the simulation can be used to estimate the cost associated with that scenario (e.g., the control parameter set X).

As noted previously, some of the costs considered by the cost function in one embodiment are:
1. Electricity supply charges (both flat rates and ToU rates)
2. Electricity demand charges
3. Battery degradation cost
4. Reduction of energy stored in the ESS
5. Incentive maneuver benefits (as a negative number)

Electricity supply and demand charges have already been described. For monthly demand charges, the charge may be calculated as an equivalent daily charge by dividing the charge by approximately 30 days, or by dividing by some other number of days, depending on how many days are remaining in the billing cycle. Battery degradation cost is described in a later section. Reduction in energy stored in an ESS accounts for the difference in value of the storage energy at the beginning of the future time domain compared to the end. Incentive maneuver benefits such as demand response can be calculated as the benefit on a per-day basis, but as a negative number.

During the cost function's electrical system simulation, several variables can be tracked and stored in memory. These include control variables, electrical power consumed by or supplied from various electrical systems, and the states of charge of any ESSs. Other variables can also be tracked and stored to memory. Any of the variables stored to memory can be output by the cost function.

Figure 11:
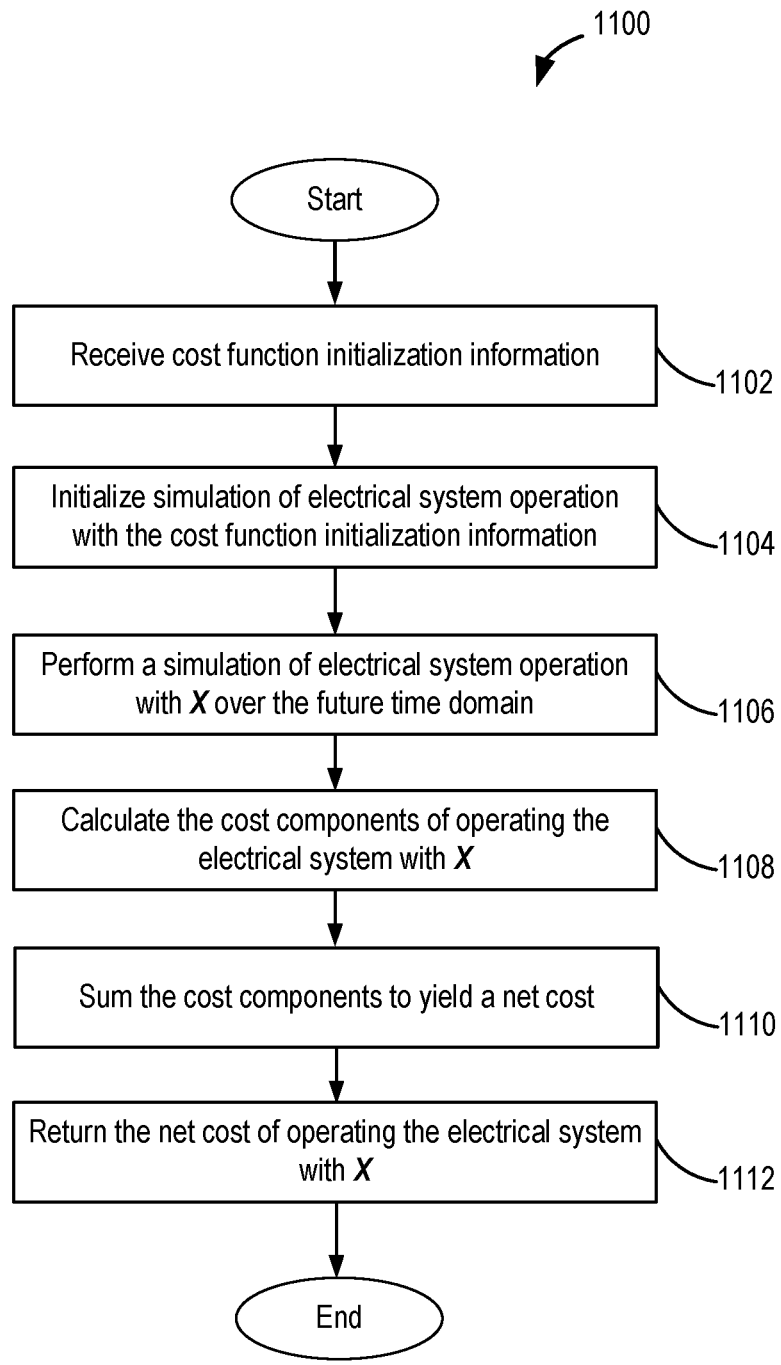
FIG. 11 is a flow diagram of a method of evaluating a cost function that is received from an external source or otherwise unprepared, according to one embodiment of the present disclosure.

FIG. 11 is a flow diagram of a method 1100 of evaluating a cost function, according to one embodiment of the present disclosure. The cost function may be received from an external source or otherwise unprepared. Cost function initialization information may be received 1102. A simulation of electrical system operation is initialized 1104 with the received 1102 cost function initialization information. The simulation is performed 1106 of the electrical system operation with control parameter set X over the future time domain. A calculation 1108 of the cost components of operating the electrical system with control parameter set X is performed. The cost components are summed 1110 to yield a net cost of operating the electrical system with control parameter set X. The net cost of operating the electrical system with control parameter set X is returned 1112 or otherwise output.

Figure 12:
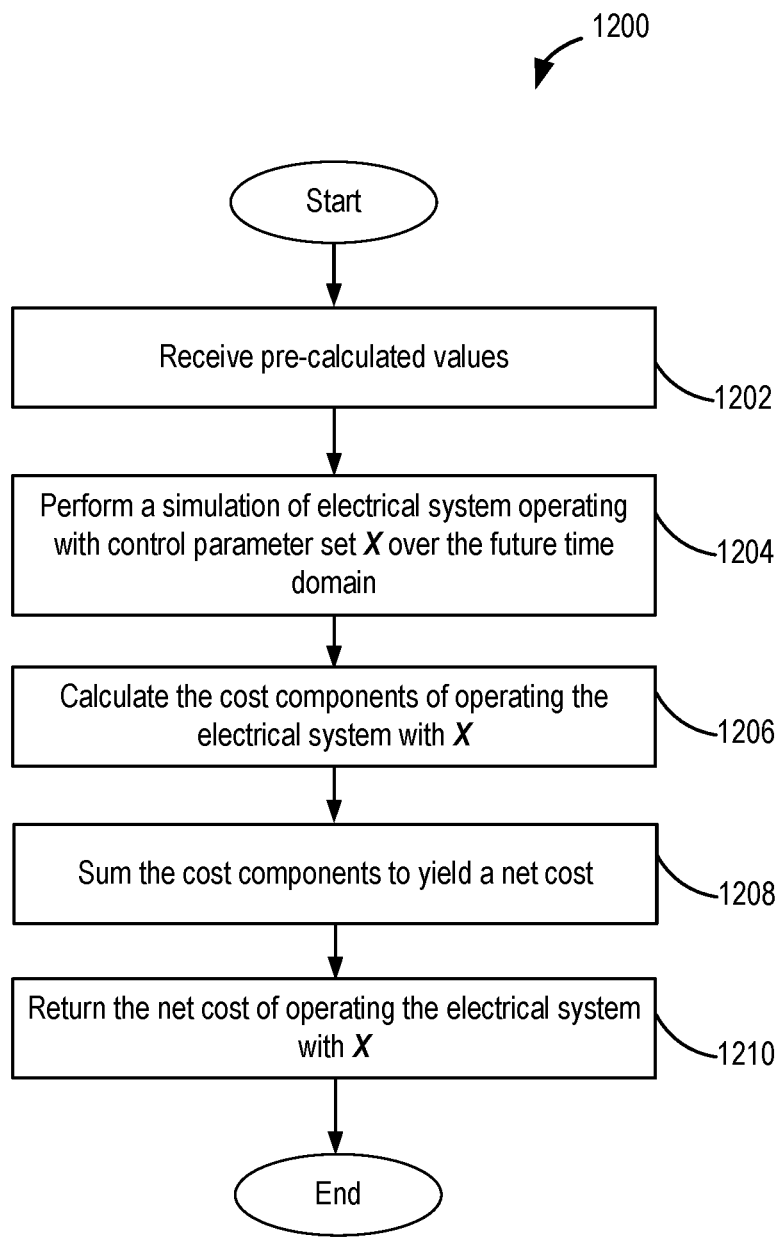
FIG. 12 is a flow diagram of a method of evaluating a prepared cost function, according to one embodiment of the present disclosure.

FIG. 12 is a flow diagram of a method 1200 of evaluating a prepared cost function, according to one embodiment of the present disclosure. The cost function may be prepared according to the method of FIG. 10. Pre-calculated values are received 1202 as inputs to the method 1200. The values may be pre-calculated during an operation to prepare the cost function, such as the process of FIG. 11. A simulation is performed 1204 of the electrical system operating with control parameter set X over the future time domain. A calculation 1206 of the cost components of operating the electrical system with control parameter set X is performed. The cost components are summed 1208 to yield a net cost of operating the electrical system with control parameter set X. The net cost of operating the electrical system with control parameter set X is returned 1210 or otherwise output.

In some embodiments, rather than returning the net cost of operating the electrical system with control parameter set X during the future time domain, what is returned is the net cost of operating the electrical system with control parameter set X as a cost per unit time (such as an operating cost in dollars per day). Returning a per-day cost can provide better normalization between the different cost elements that comprise the cost function. The cost per day, for example, can be determined by multiplying the cost of operating during the future time domain by 24 hours and dividing by the length (in hours) of the future time domain.

Execute Continuous Minimization of the Cost Function

With a prediction of load and generation made, the control parameter set X defined, and the cost function obtained and initialized and/or prepared, minimization of cost can be performed.

Minimization of the cost function may be performed by an optimization process or module that is based on an optimization algorithm. Minimization (or optimization) may include evaluating the cost function iteratively with different sets of values for the control parameter set X (e.g., trying different permutations from an initial value) until a minimum cost (e.g., a minimum value of the cost function) is determined. In other words, the algorithm may iteratively update or otherwise change values for the control parameter set X until the cost function value (e.g. result) converges at a minimum (e.g., within a prescribed tolerance). The iterative updating or changing of the values may include perturbing or varying one or more values based on prior one or more values.

Termination criteria (e.g., a prescribed tolerance, a delta from a prior value, a prescribed number of iterations) may aid in determining when convergence at a minimum is achieved and stopping the iterations in a finite and reasonable amount of time. The number of iterations that may be performed to determine a minimum could vary from one optimization cycle to a next optimization cycle. The set of values of the control parameter set X that results in the cost function returning the lowest value may be determined to be the optimal control parameter set $X_{opt}$.

In one embodiment, a numerical or computational generalized constrained nonlinear continuous optimization (or minimization) algorithm is called (e.g., executed) by a computing device.

Figure 13:
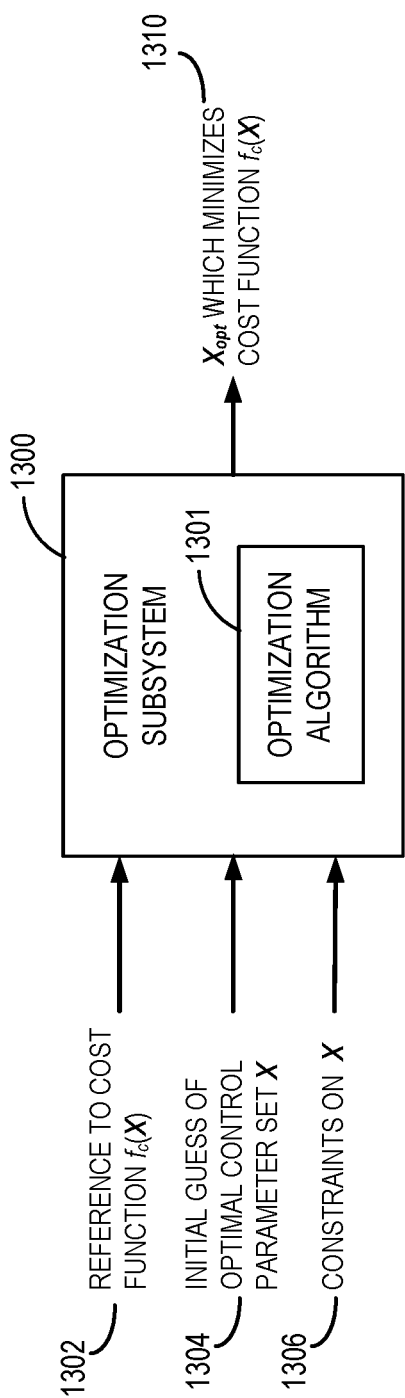
FIG. 13 is a diagrammatic representation of an optimizer that utilizes an optimization algorithm to determine an optimal control parameter set.

FIG. 13 is a diagrammatic representation of an optimization subsystem 1300 that utilizes or otherwise implements an optimization algorithm 1301 to determine an optimal control parameter set $X_{opt}$ 1310, which minimizes the cost function $f_c(X)$. In the embodiment of FIG. 13, the optimization algorithm 1301 utilized by the optimization subsystem 1300 may be a generalized constrained multivariable continuous optimization (or minimization) algorithm. A reference 1302 is provided for the cost function $f_c(X)$.

The optimization algorithm 1301 can be implemented in software, hardware, firmware, or any combination of these. The optimization algorithm 1301 may be implemented based on any approach from descriptions in literature or pre-written code, or developed from first principles. The optimization algorithm implementation can also be tailored to the specific problem of electrical system economic optimization, as appropriate in some embodiments.

Some algorithms for generalized constrained multivariable continuous optimization include:

Trust-region reflective

Active set

SQP

Interior Point

Covariance Matrix Adaption Evolution Strategy (CMAES)

Bound Optimization by Quadratic Approximation (BOBYQA)

Constrained Optimization by Linear Approximation (COBYLA)

The optimization algorithm 1301 may also be a hybrid of more than one optimization algorithm. For example, the optimization algorithm 1301 may use CMAES to find a rough solution, then Interior Point to converge tightly to a minimum cost. Such hybrid methods may produce robust convergence to an optimum solution in less time than single-algorithm methods.

Regardless of the algorithm chosen, it may be useful to make an initial guess 1304 of the control parameter set X. This initial guess 1304 enables an iterative algorithm such as those listed above to more quickly find a minimum. In one embodiment, the initial guess 1304 is derived from the previous EO execution results.

Any constraints 1306 on X can also be defined or otherwise provided. Example constraints 1306 include any minimum or maximum control parameters for the electrical system.

FIGS. 14-17 each depict the battery state of charge of the same EO running a battery on a New York City load over a year.

Figure 14:
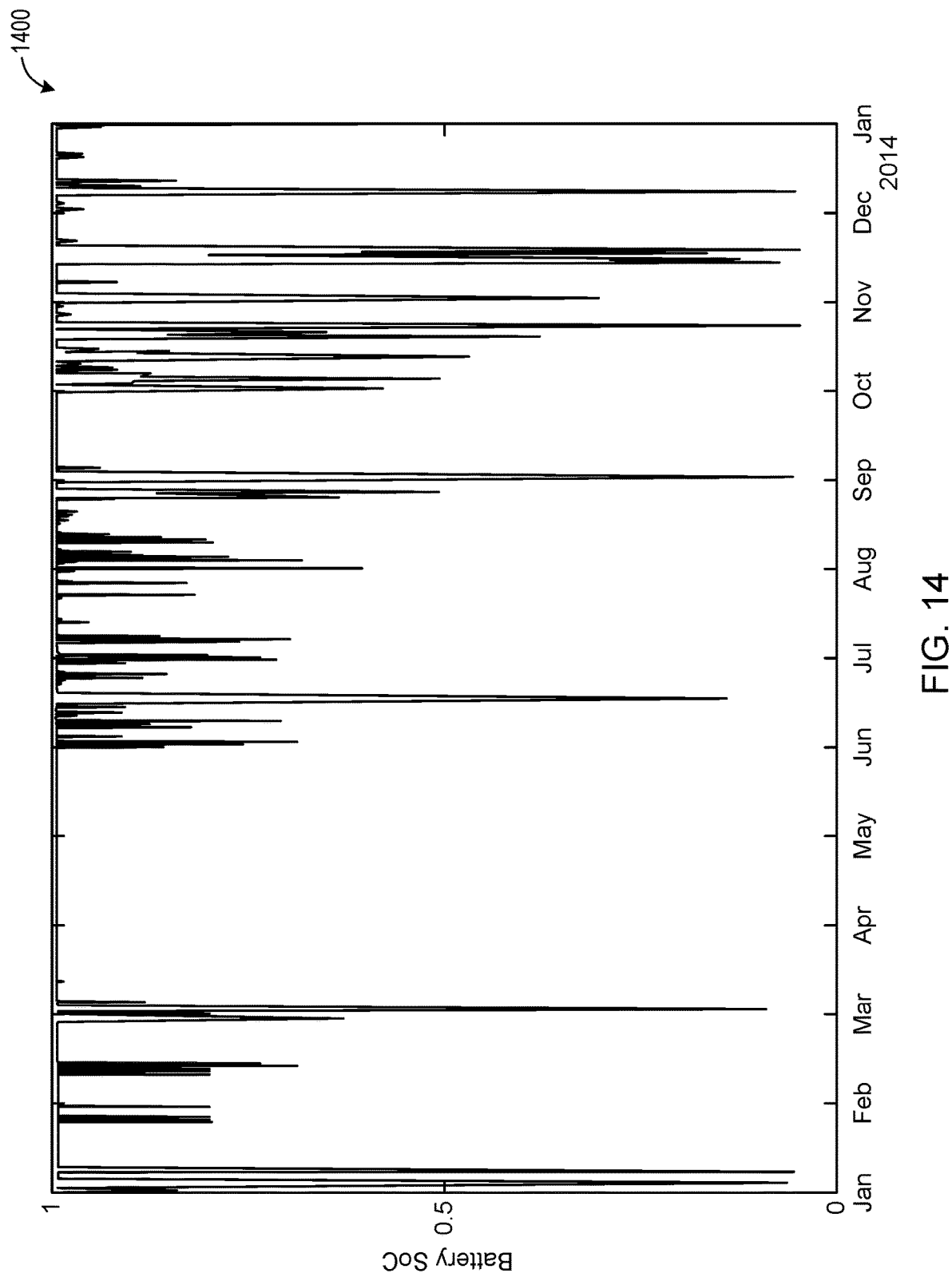
FIG. 14 is a graph providing a plot of a state of charge of an ESS over a year with no long-term objectives.

FIG. 14 is a graph 1400 providing a plot of a state of charge of an ESS over a year with no long-term objectives. Specifically, FIG. 14 illustrates an annual state of charge of a simulated 2442 kWh battery in New York City with a 300 kW inverter. The CLAF in a cost function is set to 0.2 for the entire year. The electricity bill for the year totaled to $817,109. Thus, while a rough cost of CLAF is accounted for, a long-term objective such as target battery life is not accounted for.

Methods of Addressing a Long-Term Objective

There are at least two methods of addressing a long-term objective:
1. Add an additional cost element to a cost function of the optimization algorithm.
2. Use an LSC to perform slow parameter control.

1. Using Additional Cost to Address a Long-Term Objective

One approach to addressing long-term objectives is using an additional cost in the cost function to address a long-term objective adds a cost element to the cost function. Presently available optimization engines that generate a generalized cost function may attempt to address a long-term objective by incorporating an additional cost element. The added cost element represents the cost associated with the long-term objective, and the long-term objective is addressed each and every time optimization occurs. Specifically, the cost element of the long-term objective is simply treated the same as (no different from) any other cost element of the cost function. This method does not use or need an additional controller (e.g., LSC); instead, all cost elements can be handled by an EO. This method of incorporating an additional cost element into the cost function can be extremely accurate as a monetary value is assigned to the long-term objective.

However, in certain situations there can be disadvantages or shortcoming to this method, including:
a) Creating a less stable cost function
b) Creating short-term non-optimal solutions For example, adding a cost element can create a more complex cost function with more relative extrema—or a less robust and stable cost function. Optimization algorithms can be less successful in finding the optimums when there are more relative extrema. Thus, in certain circumstances, this method can lead an EO to get stuck on an optimization result that is not the actual optimum. For example, FIG. 15 illustrates a destabilization where the long-term objective represented as an additional cost element is to maintain battery capacity above a threshold amount for exactly 10 years.

Figure 15:
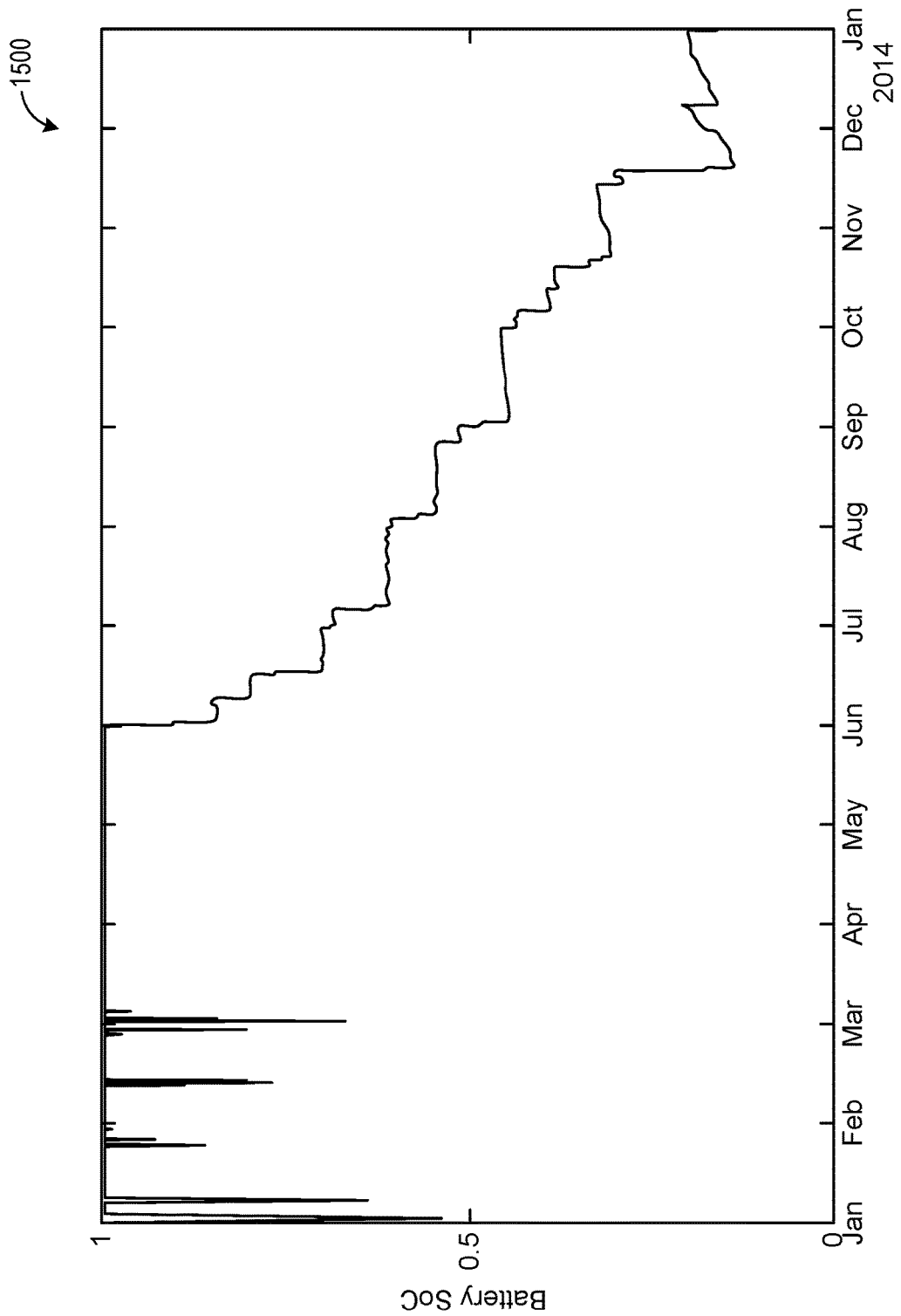
FIG. 15 is a graph providing a plot of a state of charge of an ESS over a year where an economic optimizer (EO) uses a cost to account for a long-term objective and the cost function destabilizes.

FIG. 15 is a graph 1500 providing a plot of a state of charge of an ESS over a year where an EO uses a cost element to account for a long-term objective and the cost function destabilizes. The addition of the long-term objective cost destabilizes the cost function entirely. Introducing the additional cost element creates an optimization environment that is highly unfavorable to charging over time, and thus, halfway through the year, the EO almost completely ceases to charge the battery, destabilizing the system and having a much higher cost than the original simulation.

In this embodiment, the graph 1500 illustrates the annual state of charge of a simulated 2442 kWh battery in New York City with a 300 kW inverter. The CLAF of the cost function is set to 1 for the entire year, but an additional cost element is added to regulate battery life. Although at the beginning of the year the graph appears similar to FIG. 14, the added cost element destabilizes the EO around June. The graph diverges sharply from FIG. 14, and the EO, caught in a non-optimal minimum cost, rarely charges the battery after June first. The electricity bill for the year totaled to $844,158, significantly higher than in FIG. 14, when the EO ran without the additional cost element.

Figure 16:
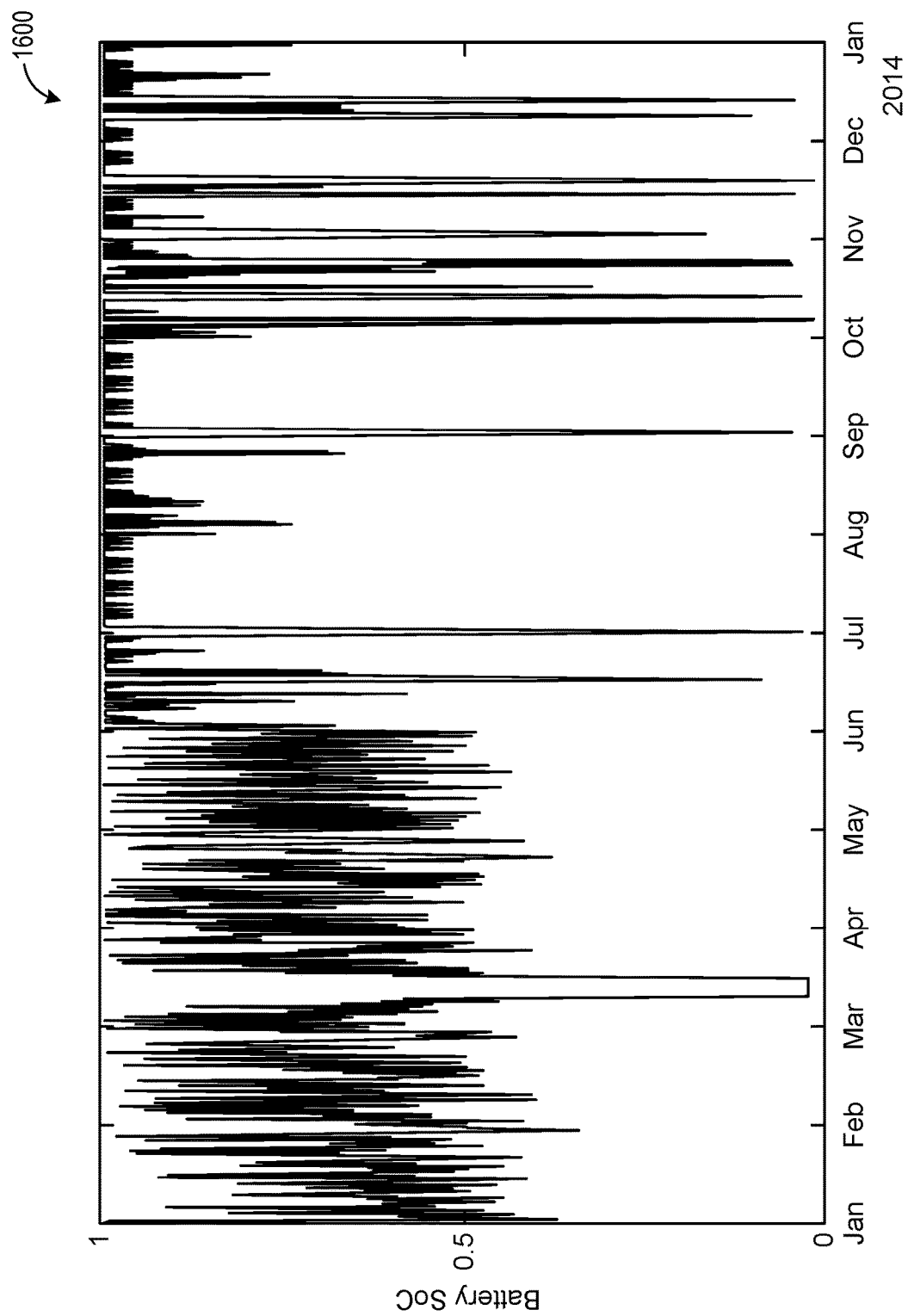
FIG. 16 is a graph providing a plot of a state of charge of an ESS over a year where an EO uses an additional cost to account for a long-term objective and the additional cost overtakes other costs.

A second disadvantage of using an additional cost element at the EO to address a long-term objective is that the additional cost associated with the long-term objective can overtake more important costs. For example, suppose the additional cost is 1,000 times larger than the other costs; now the additional cost controls the relative extrema more than more important costs, meaning an incorrect relative extrema may be found. A long-term objective of using the battery up in a year could cause discharging of the battery when there is no monetary benefit. FIG. 16, which has an additional cost element for the long-term objective added to the cost function, illustrates an example of this behavior.

FIG. 16 is a graph 1600 providing a plot of a state of charge of an ESS over a year where an EO uses an additional cost element to account for a long-term objective and the additional cost element overtakes other cost elements. FIG. 16 was simulated with the same battery and load as FIG. 14, but FIG. 16 has very different discharging behavior because the additional cost element associated with the long-term objective is much larger than the other cost elements, and thus dictates the behavior of the battery more than other cost elements.

The graph 1600 in FIG. 16 was produced with a simulated 2442 kWh battery in New York City with a 300 kW inverter. The CLAF of the cost function was set to 1 for the entire year, but an additional cost element for the long-term objective is added to the cost function to regulate battery life. The graph is significantly different from FIG. 14 because the added cost element is larger in scale than the other cost elements in the cost function. Thus, the additional cost element changes the behavior of the cost function completely, in a non-optimal way. The electricity bill for the year totaled to $843,034, significantly higher than in FIG. 14, when the EO ran without the additional cost element.

As demonstrated in FIGS. 15 and 16, if the additional cost element associated with the long-term objective is too large or disruptive, the EO may be unable to effectively incorporate the additional cost element. Thus, adding an additional cost element to a cost function works well if the added cost element has a similar scaling size and is non-disruptive, adding few relative extrema and adding relatively little variation to the cost function in order to successfully follow a long-term objective. Thus, in some embodiments, the EO may handle certain long-term objectives by incorporating an added cost element into a cost function, while an LSC may be used to handle long-term objectives that may be more disruptive.

2. Using an LSC to Perform Slow Parameter Control

The slow parameter control method changes cost function parameters with a slow controller outside of the cost function (e.g., LSC). The LSC tracks feedback from data gathered outside of the cost function—for example, battery degradation or energy use. The LSC then uses this feedback data to adjust parameters that affect the cost function in order to better meet the long-term objective. The feedback data may be used in a multitude of ways to control the parameters of the cost function associated with the long-term objective. For example, the feedback data may be used in an optimization algorithm, machine learning, or simple test-driven equations. The LSC may run at any frequency less than the EO is run. For example, the LSC may operate daily or monthly even though the EO may run every 15 minutes. As described above, FIG. 5 illustrates a block diagram of an LSC in relation to and EO.

Figure 17:
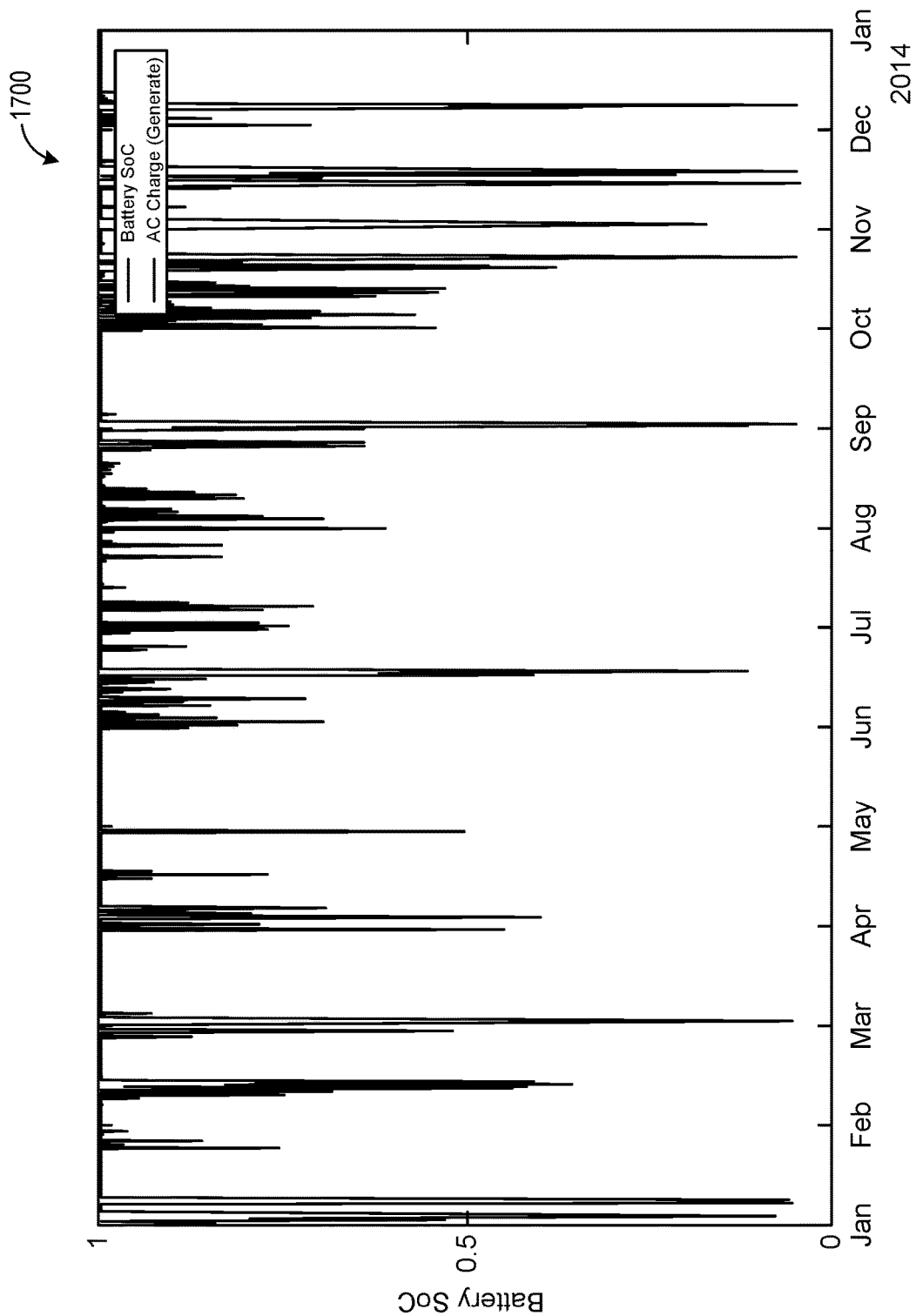
FIG. 17 is a graph providing a plot of a state of charge of an ESS over a year where an LSC is used to incorporate a long-term objective into the cost function.

FIG. 17 is a graph 1700 providing a plot of a state of charge of an ESS over a year where an LSC is used to incorporate a long-term objective into the cost function. Once again the graph 1700 is generated by simulating a 2442 kWh battery in New York City with a 300 kW inverter. A slow parameter controller (e.g., LSC) is used as the long-term objective control. In one example, a long term objective may be to make the battery last exactly 10 years. For example, the LSC can control a CLAF parameter of the cost function. The CLAF parameter may modify the cost function output. For example, the CLAF parameter may be a multiplier to scale battery degradation cost. FIG. 17 looks similar to FIG. 14 because the cost function was not changed significantly. By adjusting CLAF monthly, the LSC was able to save the customer money as shown. The electricity cost for the year was lower than that in FIG. 14, at $816,132.

The advantage of using a slow controller (e.g., LSC) is that the LSC is a high-stability solution, as no relative extrema are added to the cost function. However, slow controllers are less precise than cost element additions. Because the controller runs less frequently than optimization occurs, parameter adjustments occur infrequently. Thus, the controller may be theoretically off-target from its long-term goal for intervals between parameter adjustments. Once the controller runs, it will alter the parameters to become more on-target. A method to mitigate this issue is to have a control algorithm that uses either optimization or machine learning to find parameter solutions non-obvious to the human eye. Increasing run frequency will also increase precision, but if called too frequently, sacrifices stability. Thus, a balance between precision of solution and frequency of slow controller use must be made.

Both methods of addressing long-term objectives can be used in the EO. For example, in some embodiments, similar scaled non-disruptive costs are handled by the EO, and the larger, more disruptive costs are handled by an LSC. In some embodiments, the LSC handles all long-term objectives regardless of scale and disruption. To better understand examples of these methods, below are two examples of long-term objectives and how an electrical system can incorporate them into a cost function. The capacity factor example can be implemented on an EO or an LSC (e.g., EO 530 and LSC 560 of FIG. 5) using the method described in FIGS. 6A-6B. The battery degradation example can be implemented on an LSC (e.g., LSC 560 of FIG. 5) using the method described in FIG. 6A.

Examples of Long-Term Objectives Used by an Electrical System

Capacity Factor

Capacity factor is the ratio of output energy over a period of time to continuous output energy at full capacity for that same period of time. It is a decimal between 0 and 1 that generally represents how efficiently an energy source is being utilized. Some organizations and governments provide an incentive to ESSs able to meet a specific capacity factor over a long-term period (typically annually or longer). Thus, meeting a specific capacity factor can be a long-term objective.

These capacity factor incentives are typically represented in $/kWh of discharging, with an energy upper limit. For example, an incentive may be $0.1/kWh for every kWh discharged by the energy storage unit before it has discharged 10,000 kWh over the course of a year. There is no incentive provided if the storage unit discharges more than 10,000 kWh. Thus, the maximum incentive is $1,000.

Maximizing this incentive would meet a specific capacity factor, achieving a long-term objective. This type of incentive may be described as an equation where for x amount of energy discharge, there is an incentive of y amount. Adding this incentive as a cost to the cost function does not create new extrema, but rather nudges pre-existing extrema. For example, this incentive would encourage further battery use. Rather than changing the shape of the cost function, this incentive may just stretch the cost function to use more battery.

Because this incentive does not create new extrema, the EO or the LSC of FIG. 5 may be used. In the EO, this long-term objective is a cost within the cost function. This cost is referred to herein as the capacity factor cost (CFC). In this example, costs are measured in $/time unit, but any measure of cost can be used so long as the additional cost has the same units as other costs in the EO. The following equation represents the CFC:

$$CFC(\$/\text{time unit}) = -\frac{\begin{array}{c}\text{Max Incentive}(\$) - \\ \text{Capacity Factor Incentive }(\$/\text{kWh}) \times \\ \text{Discharged Energy (kWh)}\end{array}}{\text{Time Left in Incentive Period}} \quad \text{Equation 1.00}$$

Another way of writing the CFC would be:

$$CFC(\$/\text{time unit}) = -\frac{\text{Max Incentive}(\$) - \text{Used Incentive}(\$)}{\text{Time Left in Incentive Period}} \quad \text{Equation 1.01}$$

$$CFC(\$/\text{time unit}) = -\frac{\text{Available Incentive}}{\text{Time Left in Incentive Period}} \quad \text{Equation 1.02}$$

The CFC is negative because it is an incentive. The customer gains money from this incentive. The feedback of this long-term objective comes both in the form of time passed and total energy discharged. By tracking what has happened in the past, this additional cost is able to better regulate battery usage in the future.

As more energy is discharged, the incentive becomes worth less—thus, if during one optimization run the EO determines to discharge the battery a small amount and is not on track to hit the maximum incentive before the incentive period is over, during the next run-through the EO's optimization of the CFC will be worth more and the EO will be more likely to determine to discharge the battery more during the next period. As time passes, if the battery has not been discharged much, the incentive becomes worth more, encouraging discharge more towards the end of an incentive period.

For example, in an embodiment where there is an incentive of $0.1/kWh for every kWh discharged until the energy storage unit has discharged 10,000 kWh over the course of a year, if the time unit is seconds, the CFC equation becomes:

$$CFC(\$/\text{days}) = -\frac{\$1,000 - .1(\$/\text{kWh}) \times \text{Discharged Energy(kWh)}}{\text{Time Until End of Year(days)}} \quad \text{Equation 1.03}$$

There are bounds on the incentive. The incentive cannot be applied outside of the incentive period (Time Left in Incentive Period>0). When Used Incentive>Maximum Incentive, CFC=0 as there is no incentive left to gain.

Capacity factor could also be regulated with a slow parameter controller (e.g., LSC), but the EO may handle the capacity factor as an additional cost because CFC is a very stable representation of a capacity-factor long-term objective.

Battery Degradation

Every time a battery is used, it loses a small amount of its nominal capacity (how much energy a battery can store). This loss is referred to as battery degradation or battery capacity loss. Capacity loss to end of life (CLEOL) is how much capacity loss a battery can sustain until it is considered unusable and must be replaced. In other words, it is a measure of how much energy exists per usable capacity (as a decimal). CLEOL is dependent on the fraction of battery capacity at the end of life, which is a decimal describing the battery capacity when the battery is considered unusable to the system. For lead acid batteries, for example, the fraction of battery capacity at the end of life might be:

$$CLEOL(\text{kWh}) = \frac{\text{Battery Nominal Capacity (kWh)}}{1 - \text{Fraction of Battery Capacity at the End of Life}} \quad \text{Equation 2.0}$$

The cost of using the battery can be represented as the cost per capacity loss to end of life (CPCL).

$$CPCL = \frac{\text{Initial Cost of Battery}}{\text{Battery Nominal Capacity (kWh)}} \times CLEOL \quad \text{Equation 2.10}$$

$$CPCL = \frac{\text{Initial Cost of Battery}}{1 - \text{Fraction of Battery Capacity at the End of Life}} \quad \text{Equation 2.11}$$

The cost of battery degradation is thus:

Cost of Battery Degradation=Capacity Loss×CPCL   Equation 2.20

However, at times, the exact cost of the battery may not be known. For example, there may be incentives that will make the battery cost cheaper, or there may be non-monetary benefits such as demonstrations and research to encourage more battery use. To deal with these situations, the capacity loss adjustment factor (CLAF) is introduced into the cost function.

Cost of Battery Degradation=Capacity Loss×CLAF× CPCL   Equation 2.21

The CLAF is a decimal between 0 and 1, with 0 indicating that no battery costs will be accounted for during optimization and 1 indicating battery costs will be fully considered during optimization. Lowering the CLAF lowers the cost of battery degradation and increases battery use. Raising the CLAF raises the cost of battery degradation and decreases battery use.

The cost of battery degradation is a cost within the cost function, representing the cost of using the battery at any given time. In some embodiments, although the cost of battery degradation is dependent on the CLAF, the CPCL, and the current capacity loss, capacity loss is the primary driver and the only non-static dependence over the course of an optimization step. The cost of battery degradation thus accounts for any type of capacity loss, including charging, discharging, and aging of the battery.

However, if the battery will be replaced after a specified number of years, no matter the battery degradation cost, the cost of battery degradation may fail to take into account the wasted battery life. For example, suppose the battery will be replaced after 10 years, and the battery will be unusable when it has reached 80% of its original capacity (in other words, a fraction of battery capacity at the end of life is 0.8). Ten years pass, and 90% of the battery's original capacity remains. The battery will be replaced, but 10% of the battery capacity has been wasted.

Similar to a capacity factor incentive, we can create a cost to represent this wasted battery capacity. As described above, in some embodiments, cost of battery degradation can be viewed in dollars per available battery capacity. To represent wasted battery capacity, battery cost can be viewed in terms of time until battery replacement, referred to herein as battery cost per lifespan. To determine the cost of wasted battery capacity, the battery cost per lifespan is multiplied by the projected battery life remaining to get the cost, in dollars, of wasted money due to lack of battery use. In some embodiments, because the cost function is measured in cost per time, the result can be divided by the actual battery life remaining to get an average, per day, of the cost of wasting the projected battery life leftover.

$$\text{Cost of Leftover Battery}\left(\frac{\$}{\text{time}}\right) = \text{Battery Cost per Lifespan} \times \frac{\text{Projected Battery Life Leftover}}{\text{Actual Battery Life Remaining}} \quad \text{Equation 2.30}$$

$$\text{Cost of Leftover Battery}\left(\frac{\$}{\text{time}}\right) = \frac{\text{Initial Cost of Battery}}{\text{Ideal Battery Life}} \times \frac{\text{Projected Battery Life Leftover}}{\text{Actual Battery Life Remaining}} \quad \text{Equation 2.31}$$

$$\text{Cost of Leftover Battery}\left(\frac{\$}{\text{time}}\right) = \frac{\text{Initial Cost of Battery}}{\text{Ideal Battery Life}} \times \frac{|\text{Projected Battery Life} - \text{Ideal Battery Life}|}{\text{Ideal Battery Life} - \text{Age of Battery}} \quad \text{Equation 2.32}$$

However, using the cost of leftover battery at the EO can fail (see FIG. 16). Unlike the capacity factor cost, the cost of leftover battery at best creates non-optimum solutions and in some cases, destabilizes the cost function. The main issue is that this cost is extremely volatile because the projected battery life is volatile, especially at the beginning of a simulation. The projected battery life is based off of how much battery capacity has been used. At the beginning of the simulation, this number is using days, weeks, or months of data to project years into the future. Small changes in capacity loss result in large changes in battery life, which in turn creates a turbulent cost of leftover battery.

In addition, the cost of leftover battery is often several times larger than the other costs in the cost function. Thus, optimization is catering more to the cost of leftover battery than more important costs, like the cost of using energy or meeting a demand level. The EO therefore gains fewer savings when the cost of leftover battery is used. In some instances, the EO destabilizes. The projected battery life gets too large, and the optimizer cannot find a minimum cost of using the battery.

Instead, to address the objective of controlling battery lifespan, an LSC can be used for slow parameter control. In this embodiment, because the LSC is used to regulate battery degradation, the LSC is referred to as a battery throughput cost regulator (BTCR).

BTCR

One of the BTCR's objectives is to use the battery optimally over a time period with a scope (e.g., time frame) larger than that of the EO. This objective can be broken into several smaller objectives:
1. The BTCR provides a means of controlling the battery lifespan.
2. The BTCR leverages knowledge of future rates to use the battery more when economically beneficial.
3. Whereas the EO optimizes over a short time (e.g., 25 hours), the BTCR provides a method of optimization over several years.

In order to meet these objectives, as with any slow parameter controller (e.g., LSC), parameters must be adjusted periodically based on feedback variables. In the case of the BTCR, the parameter to be adjusted is the CLAF, which as described before, regulates battery usage. In some embodiments the BTCR could adjust additional parameters. However, for clarity, in this example the CLAF is the only parameter adjusted.

The CLAF is adjusted periodically by the BTCR based on the feedback variables, which include battery capacity loss and battery age. The feedback variables are used to measure how well the EO is doing in terms of reaching a long-term objective—in this case, a target battery life. The feedback variables, capacity loss and battery age, can be used to calculate the projected battery life, which can then be compared to the target battery life.

Battery life is proportional to battery capacity loss, assuming the battery will be used the same way in the future as it has been now. Thus, $$\frac{\text{Battery Age}}{\text{Battery Lifespan}} = \frac{\text{Battery Capacity Loss}}{1 - \text{Fraction of Battery Capacity at the End of Life}} \qquad \text{Equation 2.40}$$

In BTCR's feedback loop, the battery age, battery capacity loss, and available fraction of battery capacity (1−Fraction of Battery Capacity at the End of Life) are known. The battery lifespan is not known. Thus, the BTCR can estimate what the approximate battery life will be. For example, the BTCR can rearrange the equation to solve for the projected battery life:

$$\text{Projected Battery Life (Years)} = \frac{1 - \text{Fraction of Battery Capacity at the End of Life}}{\frac{\text{Battery Capacity Loss}}{\text{Battery Age (Years)}}} \qquad \text{Equation 2.41}$$

Finally, the BTCR can determine a relationship between projected battery life and the CLAF to use to obtain a long-term objective. There are a number of methods that can be used to create a relationship, including:

Optimization of CLAF: Using this method, the BTCR can test different CLAFs on projected load data for the next slow loop time step. The BTCR can determine the CLAF that produces the lowest cost for the next month while maintaining a desired projected battery. In this case, projected battery life (or a range of acceptable projected battery life) becomes a constraint to a new optimization problem. Staggered optimization would occur. For example, the BTCR may run this CLAF optimization on the slow loop time step (e.g., for a day, week, or month, for example) while the EO performs cost optimization for a shorter term (e.g., the next 25 hours).

Machine Learning of CLAF: The BTCR may learn the relationship between battery life and the CLAF using a machine-learning algorithm. Based on that relationship, the BTCR can pick the CLAF for each slow loop time step.

History-Based Algorithm: The BTCR can also use historic data for creating a relationship between CLAF and projected battery life. Test data from one or more cases using different CLAFs can be used to approximately define how CLAF is related to projected battery life.

For example, using the history-based algorithm, with test data from several different cases, the BTCR may come up with the following approximate solution:

New CLAF=0.25(Ideal Battery Life Now−Projected Battery Life)+Current CLAF    Equation 2.50

The Ideal Battery Life Now is the battery life objective for the next slow loop time step, and can be calculated by the BTCR based on the goal battery life (e.g., the lifespan the customer or manufacturer would like the battery to last) and the projected battery life.

(Ideal Battery Life Now×Time Left)+(Projected Battery Life×Time Passed So Far)=Goal Battery Life×Time Period    Equation 2.60 where:

Time Left+Time Passed So Far=Time Period    Equation 2.70

The goal battery life is a weighted average of the projected battery life and the ideal battery life. Thus, as the BTCR receives the goal battery life, the ideal battery life can be calculated. The time period variable represents the length of time the slow parameter control is working over. In some embodiments, the time period variable may represent the furthest point into the future the BTCR can predict. The BTCR can calculate the Ideal Battery Life Now from these equations, but they only address two out of the three objectives of the BTCR: controlling battery lifespan and optimizing over several years. The objective of leveraging rates (e.g., demand rates, electrical rates) is not addressed by this equation.

To leverage rates, two ideal battery life variables can be used by the BTCR: one to represent the Ideal Battery Life Now for the duration of a slow loop time step, and the other to represent the ideal battery life for the rest of the time period. As shown below:

(Ideal Battery Life Now×Time Now)+(Ideal Battery Life for Rest of the Time Period×Time Left Except Now)+(Projected Battery Life×Time Passed So Far)=Goal Battery Life×Time Period    Equation 2.61 where:

Time Now+Time Left Except Now+Time Passed So Far=Time Period    Equation 2.71

This leaves two variables to solve for: the Ideal Battery Life Now and the ideal battery life for the rest of the time period. Ultimately, to utilize the battery the best, the BTCR would want the battery to be used more when rates are high and less when rates are low. Thus, the BTCR can make the ideal battery life variables proportional to rates. If rates are high now, the Ideal Battery Life Now should be low to encourage more battery usage. If rates are low now, the Ideal Battery Life Now should be high to discourage lots of battery usage. Thus, the following ratio can be created and used by the BTCR:

$$\text{Ratio} = \frac{\text{Maximum Rate Now}}{\text{Average Maximum Rate for the Year}} \quad \text{Equation 2.80}$$

$$= \frac{\text{Ideal Battery Life for Rest of the Time Period}}{\text{Ideal Battery Life Now}}$$

Substituting back into the equation and solving for the ideal battery life results in:

$$\text{Ideal Battery Life Now} = \frac{\text{Goal Battery Life} \times \text{Time Period} - \text{Projected Battery Life Now} \times \text{Time Passed So Far}}{\text{Time Left Except Now} \times \text{Ratio} + \text{Time Now}} \quad \text{Equation 2.62}$$

With this equation, rates are taken into consideration. When rates are high, the CLAF will likely be lowered to encourage battery use. When the rates are low, the CLAF will likely be raised to discourage excessive battery use. In addition, projected battery life is taken into consideration. When the battery is projected to last shorter than the objective battery life, the BTCR may raise the CLAF to discourage excessive battery use. When the battery is projected to last longer than the objective battery life, the BTCR may lower the CLAF to encourage battery use.

Apparatus Architectures

Figure 18:
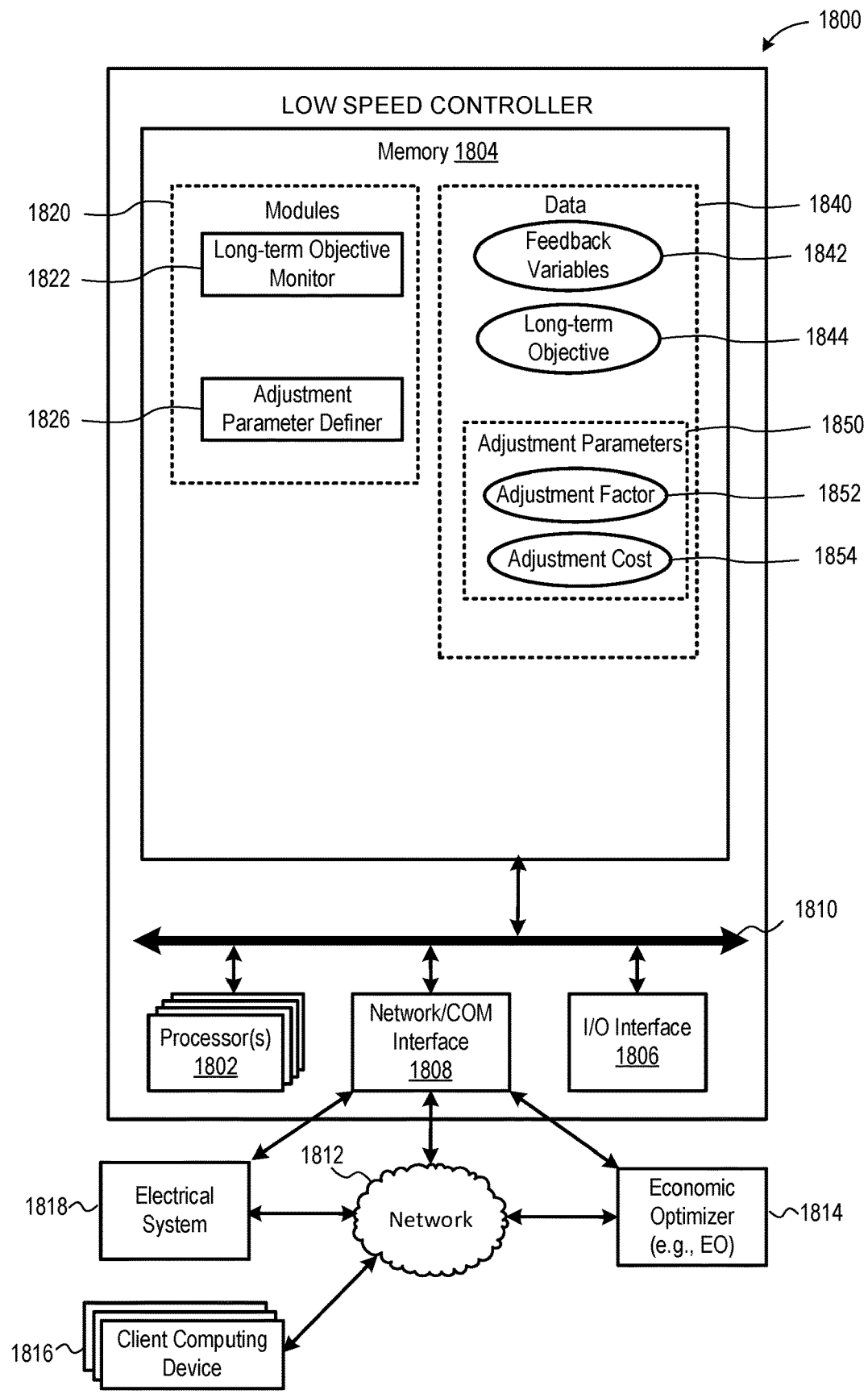
FIG. 18 is a diagram of an LSC according to one embodiment of the present disclosure.

FIG. 18 is a diagram of an LSC 1800 according to one embodiment of the present disclosure. The LSC 1800 may determine adjustment parameters 1850 or cost values for a cost function to effectuate a change to the electrical system 1818 to attempt to comply with a long-term objective. The LSC 1800 may determine the adjustment parameters 1850 based on long-term feedback variables 1842 from the electrical system 1818. The LSC 1800 may include one or more processors 1802, memory 1804, an input/output interface 1806, a network/COM interface 1808, and a system bus 1810.

The one or more processors 1802 may include one or more general purpose devices, such as an Intel®, AMD®, or other standard microprocessor. The one or more processors 1802 may include a special purpose processing device, such as ASIC, SoC, SiP, FPGA, PAL, PLA, FPLA, PLD, or other customized or programmable device. The one or more processors 1802 perform distributed (e.g., parallel) processing to execute or otherwise implement functionalities of the present embodiments. The one or more processors 1802 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 1804 may include static RAM, dynamic RAM, flash memory, one or more flip-flops, ROM, CD-ROM, DVD, disk, tape, or magnetic, optical, or other computer storage medium. The memory 1804 may include a plurality of program modules 1820 and data 1840.

The program modules 1820 may include all or portions of other elements of the EO 1814. The program modules 1820 may run multiple operations concurrently or in parallel by or on the one or more processors 1802. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like.

The system memory 1804 may also include the data 1840. Data generated by the EO 1814, such as by the program modules 1820 or other modules, may be stored on the system memory 1804, for example, as stored program data 1840. The data 1840 may be organized as one or more databases.

The input/output interface 1806 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 1808 may facilitate communication or other interaction with other computing devices 1816 (e.g., an economic optimizer 1814) and/or networks 1812, such as the Internet and/or other computing and/or communications networks. The network/COM interface 1808 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 1808 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth. The network/COM interface 1808 may be any appropriate communication interface for communicating with other systems and/or devices.

The system bus 1810 may facilitate communication and/or interaction between the other components of the system, including the one or more processors 1802, the memory 1804, the input/output interface 1806, and the network/COM interface 1808.

The modules 1820 may include a long-term objective monitor 1822, and an adjustment parameter definer 1826. The long-term objective monitor 1822 may determine a future state of the electrical system 1818 based on feedback variables 1842 and determine how close the future state is to a long-term objective. The adjustment parameter definer 1826 can change an adjustment parameter 1850 based on the results of the long-term objective monitor 1822 to effectuate a change to the electrical system 1818 to attempt to comply with the long-term objective.

The data 1840 may include feedback variables 1842, and long-term objectives 1844. The feedback variables 1842 may be received as feedback from the electrical system 1818. The long-term objectives 1844 can be received through the I/O interface 1806 from a customer, or can be pre-programmed.

The adjustment parameters 1850 may provide adjustment factors 1852 or costs 1854 to alter the cost function of an EO 1814 based on the long-term objective. The LSC 1800 may send the adjustment parameters to the EO 1814 through the network/COM interface 1808.

Figure 19:
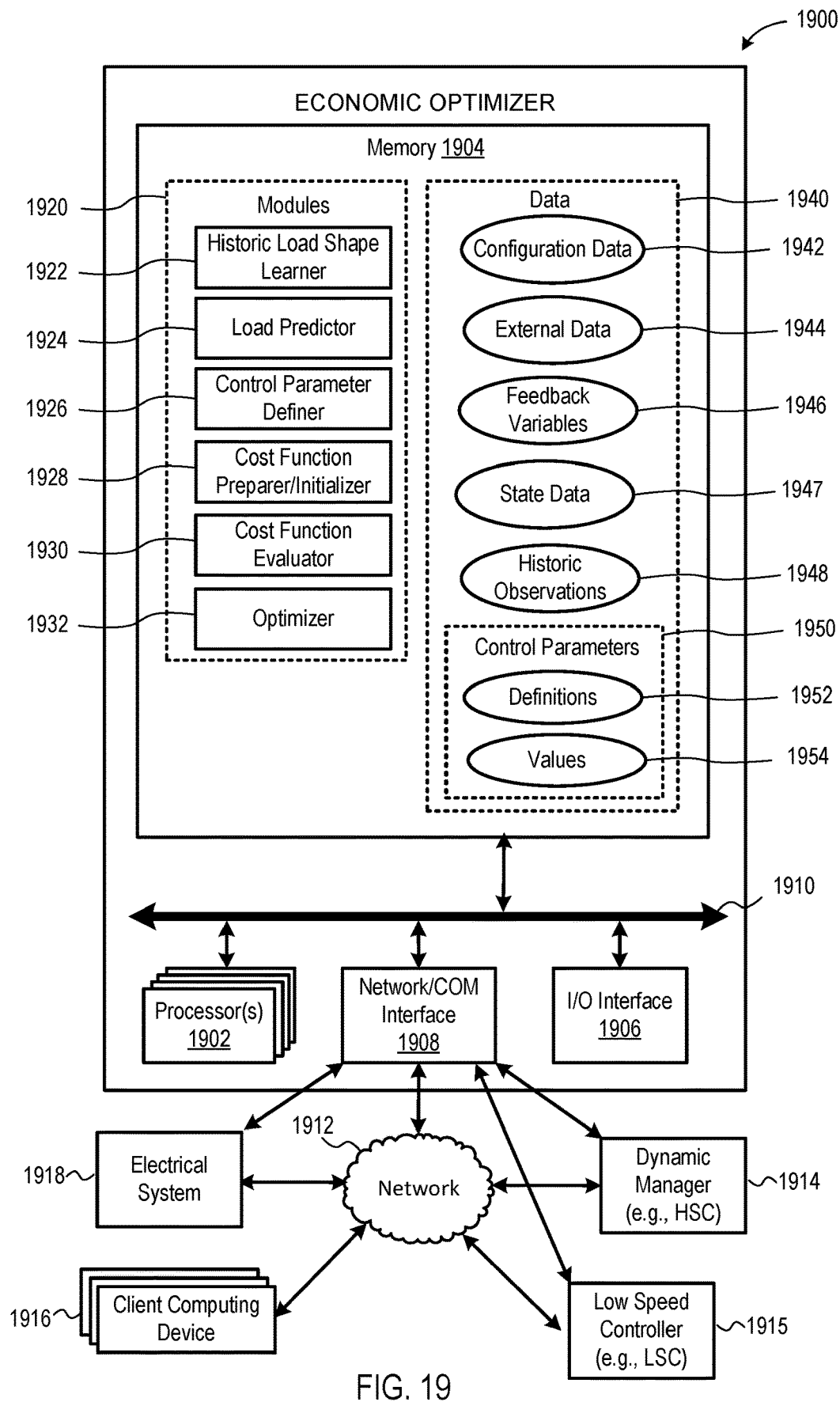
FIG. 19 is a diagram of an EO, according to one embodiment of the present disclosure.

FIG. 19 is a diagram of an EO 1900 according to one embodiment of the present disclosure. The EO 1900 may determine a control plan for managing control of an electrical system 1918 during an upcoming time domain and provide the control plan as output. The determined control plan may include a plurality of sets of parameters each to be applied for a different time segment within an upcoming time domain. The EO 1900 may determine the control plan based on a set of configuration elements specifying one or more constraints of the electrical system 1918 and defining one or more cost elements associated with operation of the electrical system 1918. The EO 1900 may also determine the control plan based on a set of process variables that provide one or more measurements of a state of the electrical system 1918. The EO 1900 may include one or more processors 1902, memory 1904, an input/output interface 1906, a network/COM interface 1908, and a system bus 1910.

The one or more processors 1902 may include one or more general purpose devices, such as an Intel®, AMD®, or other standard microprocessor. The one or more processors 1902 may include a special purpose processing device, such as ASIC, SoC, SiP, FPGA, PAL, PLA, FPLA, PLD, or other customized or programmable device. The one or more processors 1902 perform distributed (e.g., parallel) processing to execute or otherwise implement functionalities of the present embodiments. The one or more processors 1902 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 1904 may include static RAM, dynamic RAM, flash memory, one or more flip-flops, ROM, CD-ROM, DVD, disk, tape, or magnetic, optical, or other computer storage medium. The memory 1904 may include a plurality of program modules 1920 and data 1940.

The program modules 1920 may include all or portions of other elements of the EO 1900. The program modules 1920 may run multiple operations concurrently or in parallel by or on the one or more processors 1902. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like.

The system memory 1904 may also include the data 1940. Data generated by the EO 1900, such as by the program modules 1920 or other modules, may be stored on the system memory 1904, for example, as stored program data 1940. The data 1940 may be organized as one or more databases.

The input/output interface 1906 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 1908 may facilitate communication or other interaction with other computing devices (e.g., a dynamic manager 1914 and a low speed controller 1915) and/or networks 1912, such as the Internet and/or other computing and/or communications networks. The network/COM interface 1908 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 1908 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth. The network/COM interface 1908 may be any appropriate communication interface for communicating with other systems and/or devices.

The system bus 1910 may facilitate communication and/or interaction between the other components of the system, including the one or more processors 1902, the memory 1904, the input/output interface 1906, and the network/COM interface 1908.

The modules 1920 may include a historic load shape learner 1922, a load predictor 1924, a control parameter definer 1926, a cost function preparer/initializer 1928, a cost function evaluator 1930, and an optimizer 1932.

The historic load shape learner 1922 may compile or otherwise gather historic trends to determine a historic profile or an average load shape that may be used for load prediction. The historic load shape learner 1922 may determine and update an avg_load_shape array and an avg_load_shape_time_of_day array by recording load observations and using an approach to determine a suitable average of the historic load observations after multiple periods of time. The historic load shape learner 1922 may utilize a process or an approach to determining the historic average profile such as described above with reference to FIG. 8.

The load predictor 1924 may predict a load on the electrical system 1918 during an upcoming time domain. The load predictor 1924 may utilize a historic profile or historic load observations provided by the historic load shape learner 1922. The load predictor 1924 may utilize a load prediction method such as described above with reference to FIGS. 7 and 8.

The control parameter definer 1926 may generate, create, or otherwise define a control parameter set X, in accordance with a control law. The created control parameters 1950 may include a definition 1952 and a value 1954 and may be stored as data 1940.

The cost function preparer/initializer 1928 prepares or otherwise obtains a cost function to operate on the control parameter set X. The cost function may include the one or more constraints and the one or more cost elements associated with operation of the electrical system 1918. The cost function preparer/initializer 1928 pre-calculates certain values that may be used during iterative evaluation of the cost function involved with optimization.

The cost function evaluator 1930 evaluates the cost function based on the control parameter set X. Evaluating the cost function simulates operation of the electrical system 1918 for a given time period under a given set of circumstances set forth in the control parameter set X and returns a cost of operating the electrical system 1918 during the given time period.

The optimizer 1932 may execute a minimization of the cost function by utilizing an optimization algorithm to find the set of values for the set of control variables. Optimization (e.g., minimization) of the cost function may include iteratively utilizing the cost function evaluator 1930 to evaluate the cost function with different sets of values for a control parameter set X until a minimum cost is determined. In other words, the algorithm may iteratively change values for the control parameter set X to identify an optimal set of values in accordance with one or more constraints and one or more cost elements associated with operation of the electrical system 1918.

The data 1940 may include configuration data 1942, external data 1944, process variables (e.g., feedback variables 1946), state data 1947, historic observations 1948, and control parameters 1950 (including definitions 1952 and values 1954).

The configuration data 1942 may be provided to, and received by, the EO 1900 to communicate constraints and characteristics of the electrical system 1918.

The external data 1944 may be received as external input (e.g., weather reports, changing tariffs, fuel costs, event data), which may inform the determination of the optimal set of values.

The process variables 1946 may be received as feedback from the electrical system 1918. The process variables 1946 are typically measurements of the state of the electrical system 1918 and are used to, among other things, determine how well objectives of controlling the electrical system 1918 are being met.

The state data 1947 would be any EO state information that may be helpful to be retained between one EO iteration and the next. An example is avg_load_shape.

The historic observations 1948 are the record of process variables 1946 that have been received. A good example is the set of historic load observations that may be useful in a load predictor algorithm.

As noted earlier, the control parameter definer 1926 may create control parameters 1950, which may include a definition 1952 and a value 1954 and may be stored as data 1940. The cost function evaluator 1930 and/or the optimizer 1932 can determine values 1954 for the control parameters 1950.

The EO 1900 may provide one or more control parameters 1950 as a control parameter set X to the dynamic manager 1914 via the network/COM interface 1908 and/or via the network 1912. The dynamic manager 1914 may then utilize the control parameter set X to determine values for a set of control variables to deliver to the electrical system 1918 to effectuate a change to the electrical system 1918 toward meeting one or more objectives (e.g., economic optimization) for controlling the electrical system 1918.

In other embodiments, the EO 1900 may communicate the control parameter set X directly to the electrical system 1918 via the network/COM interface 1908 and/or via the network 1912. In such embodiments, the electrical system 1918 may process the control parameter set X directly to determine control commands, and the dynamic manager 1914 may not be included.

In still other embodiments, the EO 1900 may determine values for a set of control variables 1950 (rather than for a control parameter set X) and may communicate the set of values for the control variables 1950 directly to the electrical system 1918 via the network/COM interface 1908 and/or via the network 1912.

One or more client computing devices 1916 may be coupled via the network 1912 and may be used to configure, provide inputs, or the like to the EO 1900, the dynamic manager 1914, and/or the electrical system 1918.

Figure 20:
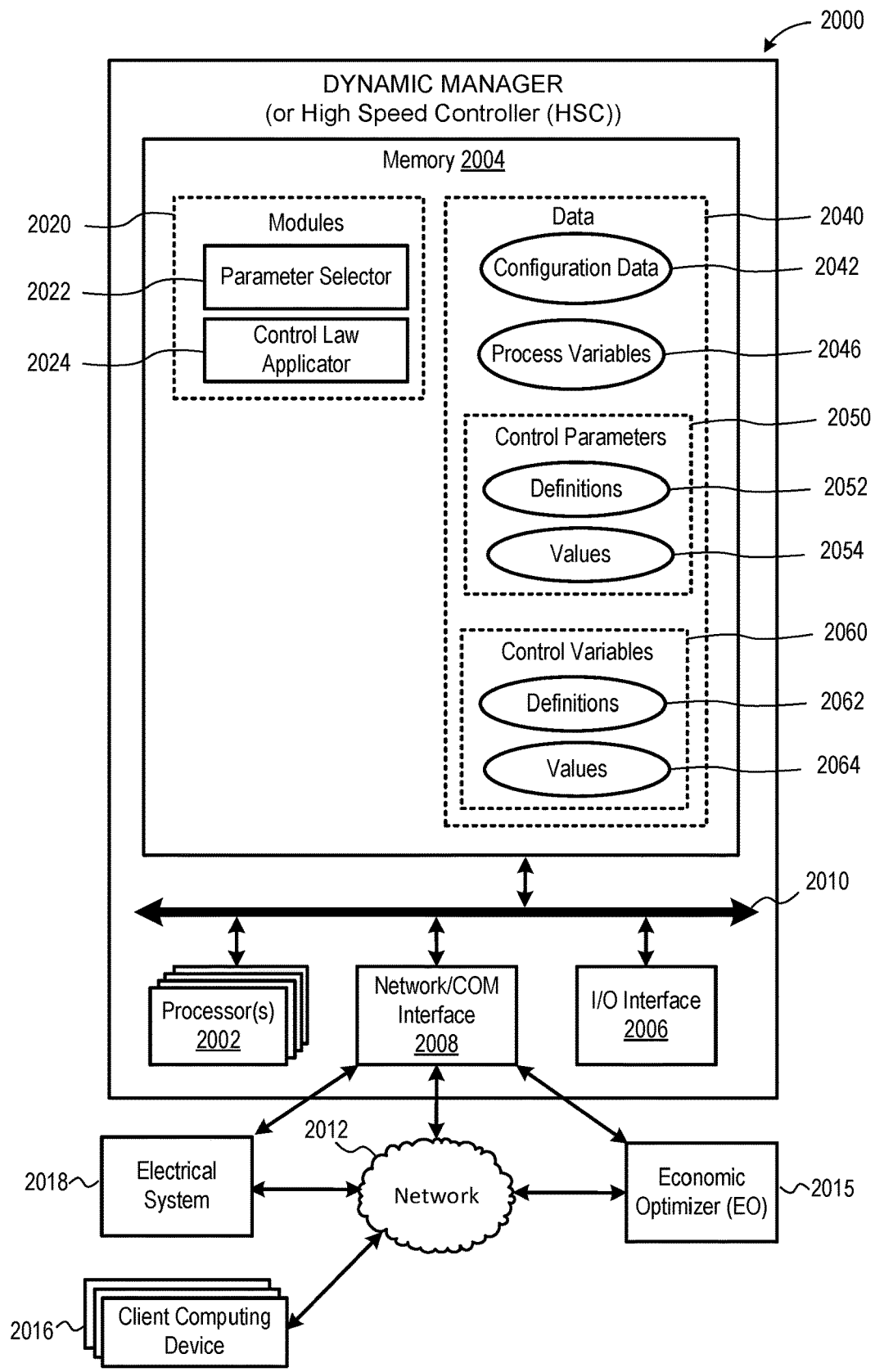
FIG. 20 is a diagram of a dynamic manager, according to one embodiment of the present disclosure.

FIG. 20 is a diagram of a dynamic manager 2000, according to one embodiment of the present disclosure. The dynamic manager 2000, according to one embodiment of the present disclosure, is a second computing device that is separate from an EO 2015, which may be similar to the EO 1900 of FIG. 19. The dynamic manager 2000 may operate based on input (e.g., a control parameter set X) received from the EO 2015. The dynamic manager 2000 may determine a set of control values for a set of control variables for a given time segment of the upcoming time domain and provide the set of control values to an electrical system 2018 to effectuate a change to the electrical system 2018 toward meeting an objective (e.g., economical optimization) of the electrical system 2018 during an upcoming time domain. The dynamic manager 2000 determines the set of control values based on a control law and a set of values for a given control parameter set X. The dynamic manager 2000 may include one or more processors 2002, memory 2004, an input/output interface 2006, a network/COM interface 2008, and a system bus 2010.

The one or more processors 2002 may include one or more general purpose devices, such as an Intel®, AMD®, or other standard microprocessor. The one or more processors 2002 may include a special purpose processing device, such as ASIC, SoC, SiP, FPGA, PAL, PLA, FPLA, PLD, or other customized or programmable device. The one or more processors 2002 perform distributed (e.g., parallel) processing to execute or otherwise implement functionalities of the present embodiments. The one or more processors 2002 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 2004 may include static RAM, dynamic RAM, flash memory, one or more flip-flops, ROM, CD-ROM, DVD, disk, tape, or magnetic, optical, or other computer storage medium. The memory 2004 may include a plurality of program modules 2020 and program data 2040.

The program modules 2020 may include all or portions of other elements of the dynamic manager 2000. The program modules 2020 may run multiple operations concurrently or in parallel by or on the one or more processors 2002. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The system memory 2004 may also include data 2040. Data generated by the dynamic manager 2000, such as by the program modules 2020 or other modules, may be stored on the system memory 2004, for example, as stored program data 2040. The stored program data 2040 may be organized as one or more databases.

The input/output interface 2006 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 2008 may facilitate communication with other computing devices and/or networks 2012, such as the Internet and/or other computing and/or communications networks. The network/COM interface 2008 may couple (e.g., electrically couple) to a communication path (e.g., direct or via the network) to the electrical system 2018. The network/COM interface 2008 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 2008 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 2010 may facilitate communication and/or interaction between the other components of the system, including the one or more processors 2002, the memory 2004, the input/output interface 2006, and the network/COM interface 2008.

The modules 2020 may include a parameter selector 2022 and a control law applicator 2024.

The parameter selector 2022 may pick which set of parameters to be used from the control parameter set X, according to a given time segment.

The control law applicator 2024 may process the selected set of parameters from the control parameter set X and convert or translate the individual set of parameters into control variables (or values thereof). The control law applicator 2024 may apply logic and/or a translation process to determine a set of values for a set of control variables based on a given set of parameters (from a control parameter set X) for a corresponding time segment. For example, the control law applicator 2024 may apply a method and/or logic as shown in FIG. 16.

The data 2040 may include configuration data 2042, process variables 2046, control parameters 2050 (including definitions 2052 and values 2054), and/or control variables 2060 (including definitions 2062 and values 2064).

The configuration data 2042 may be provided to, and received by, the dynamic manager 2000 to communicate constraints and characteristics of the electrical system 1918.

The process variables 2046 may be received as feedback from the electrical system 2018. The process variables 2046 are typically measurements of the state of the electrical system 2018 and are used to, among other things, determine how well objectives of controlling the electrical system 2018 are being met. Historic process variables 2046 may be utilized by the dynamic manager 2000, for example, to calculate demand, which may be calculated as average building power over the previous 15 or 30 minutes. The dynamic manager 2000 can determine the set of control values for the set of control variables based on the process variables 2046.

The control parameters 2050 may comprise a control parameter set X that includes one or more sets of parameters each for a corresponding time segment of an upcoming time domain. The control parameters 2050 may additionally, or alternatively, provide a control plan for the upcoming time domain. The control parameters 2050 may be received from an EO 2015 as an optimal control parameter set $X_{opt}$.

The control variables 2060 may be generated by the parameter selector 2022 based on an optimal control parameter set $X_{opt}$.

The dynamic manager 2000 may receive the optimal control parameter set $X_{opt}$ from the EO 2015 via the network/COM interface 2008 and/or via the network 2012. The dynamic manager 2000 may also receive the process variables 2046 from the electrical system 2018 via the network/COM interface 2008 and/or via the network 2012.

The dynamic manager 2000 may provide the values for the set of control variables to the electrical system 2018 via the network/COM interface 2008 and/or via the network 2012.

One or more client computing devices 2016 may be coupled via the network 2012 and may be used to configure, provide inputs, or the like to the EO 2015, the dynamic manager 2000, and/or the electrical system 2018.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1. A controller of an electrical system, the controller comprising: a data storage device to store a long-term objective; a communication interface to receive one or more feedback variables and to send to an economic optimizer (EO) one or more parameters of a cost function for the electrical system, wherein the one or more feedback variables indicate status (e.g., a condition, an operating condition) of the electrical system, wherein the one or more parameters are associated with the long-term objective; and one or more processors operably coupled to the data storage device and the communication interface, the one or more processors configured to: determine a projected state of the electrical system using the one or more feedback variables; determine a relation between the projected state of the electrical system and the one or more parameters of the cost function associated with the long-term objective; adjust the one or more parameters of the cost function based on the relation between the projected state of the electrical system and the one or more parameters to effectuate a change to the electrical system to attempt to comply with the long-term objective; and provide the one or more parameters as adjusted to the EO via the communication interface to configure the EO.

Example 2. The controller of example 1, wherein the one or more processors provide the one or more parameters to the EO less frequently than the EO provides one or more control values to the electrical system.

Example 3. The controller of example 1, wherein the long-term objective extends over a larger period than one or more objectives of the EO.

Example 4. The controller of example 1, wherein the long-term objective comprises controlling a lifespan of a battery in the electrical system.

Example 5. The controller of example 4, wherein the one or more feedback variables comprise battery capacity loss and battery age.

Example 6. The controller of example 4, wherein the projected state of the electrical system comprises a projected lifespan of the battery; and wherein the one or more parameters associated with the long-term objective comprise a capacity loss adjustment factor (CLAF).

Example 7. The controller of example 1, wherein the one or more processors are further configured to: simulate multiple values for the one or more parameters with a projected load for a future time period, wherein the one or more parameters are adjusted to a value of the multiple values that causes the electrical system to come closest to complying with the long-term objective.

Example 8. The controller of example 1, wherein to determine the relation between the projected state of the electrical system and the one or more parameters associated with the long-term objective, the one or more processors are further configured to use machine learning.

Example 9. The controller of example 1, wherein to determine the relation between the projected state of the electrical system and the one or more parameters associated with the long-term objective, the one or more processors are further configured to use historical data.

Example 10. An electrical control system, comprising: one or more sensors coupled to an energy storage device of an electrical system and one or more loads of the electrical system, the one or more sensors configured to measure operating conditions of the energy storage device; a first controller coupled to the one or more sensors and the electrical system, the first controller configured to: determine a set of control values for a set of control variables to effectuate a change to one or more components of the electrical system toward meeting a short-term objective for economical optimization of the electrical system, the set of control values determined by the first controller using an optimization algorithm to identify the set of control values in accordance with one or more constraints and one or more cost elements associated with operation of the one or more components of the electrical system; and provide the set of control variables to the electrical system to effectuate the change to the electrical system to comply with the short term objective for economical optimization; and a second controller coupled to the first controller, the second controller configured to: track the one or more operating conditions of the energy storage device; project a future state of the energy storage device based on the operating conditions; compare the future state to a long-term objective; determine an adjustment factor for the optimization algorithm to effectuate a change to the electrical system to attempt to comply with the long-term objective based on the comparison; and provide the adjustment factor to the first controller.

Example 11. The electrical control system of example 10, wherein the first controller and the second controller operate during staggered periods.

Example 12. The electrical control system of example 10, wherein the first controller is configured to operate more frequently than the second controller, and wherein the first controller is configured to reuse the adjustment factor until the second controller provides a new adjustment factor.

Example 13. The electrical control system of example 10, wherein the second controller uses a second optimization algorithm, machine learning, or test-driven equations to determine how the adjustment factor will affect the operating conditions and future state of the electrical system.

Example 14. The electrical control system of example 10, wherein the operating conditions comprise battery degradation.

Example 15. The electrical control system of example 10, wherein the operating conditions comprise battery capacity loss and battery age.

Example 16. The electrical control system of example 10, wherein the future state of the energy storage device comprises a projected battery life, and wherein the long-term objective comprises a desired battery life.

Example 17. The electrical control system of example 16, wherein the second controller determines the projected battery life as: Projected Battery Life=(1−Fraction of Desired Battery Capacity at the End of Life)/((Battery Capacity Loss)/(Battery Age))

Example 18. The electrical control system of example 16, wherein the adjustment factor regulates battery usage.

Example 19. The electrical control system of example 18, wherein the second controller is further configured to:

modify the adjustment factor to discourage excessive battery use when the projected battery life is shorter than the desired battery life, and modify the adjustment factor to encourage battery use when the projected battery life is longer than the desired battery life.

Example 20. A method of a controller to optimize overall economics of operation of an electrical system, the method comprising: at a first frequency: determining a set of control values for a set of control variables to effectuate a change to one or more components of the electrical system toward meeting a short-term objective for economical optimization of the electrical system, the set of control values determined by a first controller using an optimization algorithm; and providing the set of control variables to the electrical system to effectuate the change to the electrical system to comply with the short term objective for economical optimization; and at a second frequency: determining a projected state of an electrical storage system based on operating conditions; determining a relationship between the projected state of the electrical storage system and an adjustment factor within the optimization algorithm; and modifying the adjustment factor based on the relationship to effectuate a change to the electrical system to attempt to comply with a long-term objective.

Example 21. The method of example 20, wherein the first frequency is faster than the second frequency.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer-executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "couple," and any other variation thereof are intended to cover a physical connection, an electrical connection, a magnetic connection, an optical connection, a communicative connection, a functional connection, and/or any other connection.

Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Various operational steps, as well as components for carrying out operational steps, may be implemented in alternative ways depending upon the particular application or in consideration of any number of cost functions associated with the operation of the system; e.g., one or more of the steps may be deleted, modified, or combined with other steps.

While the principles of this disclosure have been shown in various embodiments, many modifications of structure, arrangements, proportions, elements, materials and components, used in practice, which are particularly adapted for a specific environment and operating requirements, may be used without departing from the principles and scope of this disclosure. These and other changes or modifications are intended to be included within the scope of the present disclosure.

The scope of the present invention should, therefore, be determined only by the following claims.

The invention claimed is:

1. A long-term controller of an electrical system, comprising:
a memory to store a long-term objective for the electrical system;
a communication interface to:
receive one or more feedback variables indicating status of the electrical system; and
transmit one or more long-term parameters to a short-term controller, the one or more long-term parameters associated with the long-term objective; and
one or more processors to:
determine a projected state of the electrical system using the one or more feedback variables;
determine a relation between the projected state of the electrical system and the one or more long-term parameters associated with the long-term objective;
adjust the one or more long-term parameters based on the relation between the projected state of the electrical system and the one or more parameters to effectuate a change to the electrical system toward compliance with the long-term objective; and
provide, via the communication interface, the one or more parameters as adjusted to configure the short-term controller.

2. The long-term controller of claim 1, wherein the one or more processors provide the one or more parameters to the short-term controller less frequently than the short-term controller provides one or more control values to effectuate a change to the electrical system.

3. The long-term controller of claim 1, wherein the long-term objective extends over a larger period than one or more objectives of the short-term controller.

4. The long-term controller of claim 1, wherein the long-term objective comprises controlling a lifespan of a component of the electrical system.

5. The long-term controller of claim 1, wherein the short-term controller is configured to provide control values for control variables for control of the electrical system over an upcoming time domain, and wherein the long-term controller provides the one or more parameters as adjusted to configure the short-controller during at least a portion of a plurality of upcoming time domains.

6. The long-term controller of claim 1, wherein the long-term controller provides the one or more parameters as adjusted to the short-term controller for inclusion as long-term parameters in a cost function of an optimizing algorithm of the short-term controller.

7. The long-term controller of claim 1, wherein the one or more processors are further configured to:
simulate multiple values for the one or more parameters with a projected load for a future time period, wherein the one or more parameters are adjusted to a value of the multiple values that causes the electrical system to come closest to complying with the long-term objective.

8. An electrical control system, comprising:
one or more sensors coupled to one or more components of an electrical system, the one or more sensors configured to measure operating conditions of the one or more components of the electrical system;
a short-term controller to:
  determine a set of control values for a set of control variables to effectuate a change to the electrical system toward meeting a short-term objective of the electrical system, the set of control values determined by using an optimization algorithm to identify the set of control values in accordance with one or more constraints and one or more cost elements associated with operation of the one or more components of the electrical system; and
  provide the set of control variables to the electrical system to effectuate the change to the electrical system toward the short-term objective; and
a long-term controller-coupled to the short-term controller, the long-term controller configured to:
  track the one or more operating conditions of the electrical system;
  project a future state of the one or more components of the electrical system based on the operating conditions of the one or more components of the electrical system;
  compare the future state to a long-term objective;
  determine an adjustment factor for the optimization algorithm to effectuate a change to the electrical system toward the long-term objective based on the comparison; and
  provide the adjustment factor to the short-term controller.

9. The electrical control system of claim 8, wherein the short-term controller provides the control values of the control variables as part of a control plan providing for control of the electrical system over an upcoming time domain, and wherein the long-term controller provides the adjustment factor for use by the first controller during a plurality of upcoming time domains.

10. The electrical control system of claim 8, wherein the short-term controller is configured to determine the set of control values for the set of control variables more frequently than the long-term controller determines the adjustment factor, and wherein the short-term controller is configured to reuse the adjustment factor until the long-term controller provides a new adjustment factor.

11. The electrical control system of claim 8, wherein the long-term controller uses a second optimization algorithm, machine learning, or test-driven equations to determine how the adjustment factor will affect the operating conditions and future state of the electrical system.

12. The electrical control system of claim 8, wherein the operating conditions comprise battery degradation.

13. The electrical control system of claim 8, wherein the operating conditions comprise battery capacity loss and battery age.

14. The electrical control system of claim 8, wherein the future state of the energy storage device comprises a projected battery life, and wherein the long-term objective comprises a desired battery life.

15. A method of a controller of an electrical system, the method comprising:
at a first frequency:
  determining a set of control values for a set of control variables to effectuate a change to one or more components of the electrical system toward meeting a short-term objective, the set of control values determined using an optimization algorithm; and
  providing the set of control variables to the electrical system to effectuate the change to the electrical system toward the short-term objective; and
at a second frequency:
  determining a projected state of the electrical system based on operating conditions;
  determining a relationship between the projected state of the electrical system and an adjustment factor within the optimization algorithm; and
  modifying the adjustment factor based on the relationship to effectuate a change to the electrical system toward a long-term objective.

16. The method of claim 15, wherein the first frequency is faster than the second frequency.

17. The method of claim 15, wherein determining the set of control values for the set of control variables comprises determining a plurality of sets of control values to determine a control plan to optimize control of the electrical system over an upcoming time domain.

18. The method of claim 17, wherein the adjustment factor is applied during at least a portion of a plurality of upcoming time domains.

19. The method of claim 15, further comprising, at the second frequency, determining the adjustment factor.

20. The method of claim 15, wherein the long-term objective comprises controlling a lifespan of a component of the electrical system.

* * * * *